(12) United States Patent
Huang et al.

(10) Patent No.: US 11,209,953 B2
(45) Date of Patent: Dec. 28, 2021

(54) OBJECT SWITCHING METHOD AND APPARATUS AND INTERFACE PRESENTATION METHOD AND APPARATUS BASED ON VISUAL PROGRAMMING

(71) Applicant: Tencent Technology (Shenzhen) Company Limited, Guangdong (CN)

(72) Inventors: Zili Huang, Shenzhen (CN); Boran Pang, Shenzhen (CN); Chenglong Hu, Shenzhen (CN); Zekai Liao, Shenzhen (CN); Zishun Chen, Shenzhen (CN); Huafeng Ma, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 0 days.

(21) Appl. No.: 17/240,632

(22) Filed: Apr. 26, 2021

(65) Prior Publication Data

US 2021/0247875 A1    Aug. 12, 2021

Related U.S. Application Data

(63) Continuation of application No. PCT/CN2020/078863, filed on Mar. 11, 2019.

(30) Foreign Application Priority Data

Apr. 5, 2019  (CN) .......................... 201910273505.8

(51) Int. Cl.
*G06F 3/0481*    (2013.01)
*G06F 3/0484*    (2013.01)
(Continued)

(52) U.S. Cl.
CPC .......... *G06F 3/0481* (2013.01); *G06F 3/0486* (2013.01); *G06F 3/04842* (2013.01); *G06F 8/34* (2013.01)

(58) Field of Classification Search
CPC .. G06F 3/0481; G06F 3/04842; G06F 3/0486; G06F 8/34; G06F 8/38; G06F 3/04845; G06F 3/0484; G06F 3/048
See application file for complete search history.

(56) References Cited

U.S. PATENT DOCUMENTS

2007/0247440 A1    10/2007  Shin et al.
2009/0164906 A1*   6/2009   Stallings ............ H04N 21/4312
                                              715/730

(Continued)

FOREIGN PATENT DOCUMENTS

CN    102158667    8/2011
CN    103473215    12/2013
(Continued)

OTHER PUBLICATIONS

International Search Report dated Jun. 19, 2020 in PCT Application PCT/CN2020/078863, filed Mar. 11, 2020 (with English Translation).

(Continued)

*Primary Examiner* — Jeanette J Parker
(74) *Attorney, Agent, or Firm* — Oblon, McClelland, Maier & Neustadt, L.L.P.

(57) ABSTRACT

In an object switching method based on visual programming that is applicable to a terminal device, an object switching instruction is obtained through an object management region of a target interface. The object switching instruction carries an object identifier of a first object. According to the object switching instruction, a second operable interface corresponding to a second object is switched to a first operable interface corresponding to the first object in a visual layout region of the target interface, and a programmable interface corresponding to the second object is switched to a programmable interface corresponding to the first object in a visual programming region of the target interface. The first object and the second object are comprised in the object management region, and the first object and the second object have different object identifiers.

20 Claims, 17 Drawing Sheets

(51) Int. Cl.
     *G06F 3/0486*     (2013.01)
     *G06F 8/34*       (2018.01)

(56) References Cited

U.S. PATENT DOCUMENTS

| | | | | |
|---|---|---|---|---|
| 2011/0057947 A1* | 3/2011 | Kobayashi | ............... | G09G 5/26 |
| | | | | 345/592 |
| 2013/0067375 A1* | 3/2013 | Kim | ............... | G05F 1/66 |
| | | | | 715/769 |
| 2014/0181725 A1 | 6/2014 | Yang et al. | | |

FOREIGN PATENT DOCUMENTS

| | | |
|---|---|---|
| CN | 104699399 | 6/2015 |
| CN | 106528032 | 3/2017 |
| CN | 106730610 | 5/2017 |
| CN | 107038112 | 8/2017 |
| CN | 107315595 | 11/2017 |
| CN | 107469351 | 12/2017 |
| CN | 108536344 | 9/2018 |
| CN | 109960504 | 7/2019 |
| KR | 2014-0080174 | 6/2014 |

OTHER PUBLICATIONS

Written Opinion dated Jun. 19, 2020 in PCT Application PCT/CN2020/078863, filed Mar. 11, 2020.
Office Action dated Feb. 24, 2021 in corresponding Chinese patent application No. 201910273505.8.

* cited by examiner (a)

(b)

OBJECT SWITCHING METHOD AND APPARATUS AND INTERFACE PRESENTATION METHOD AND APPARATUS BASED ON VISUAL PROGRAMMING

RELATED APPLICATIONS

This application claims priority to International Application No. PCT/CN2020/078863, filed on Mar. 11, 2020, which claims priority to Chinese Patent Application No. 201910273505.8, entitled "OBJECT SWITCHING METHOD AND APPARATUS AND INTERFACE PRESENTATION METHOD AND APPARATUS BASED ON VISUAL PROGRAMMING" and filed on Apr. 5, 2019. The entire disclosures of the prior applications are hereby incorporated by reference in their entirety.

FIELD OF THE TECHNOLOGY

This application relates to the field of computer technologies, including an object switching method and apparatus and an interface presentation method and apparatus based on visual programming.

BACKGROUND OF THE DISCLOSURE

Visual programming aims to visualize programming work. That is, a result may be seen at any time, to synchronize a program with a result. Compared with a related programming mode, the visual programming does not require programming. Design work of interfaces may be completed in an intuitive operation manner, and a program designer may construct various interfaces of application programs like building blocks by using various controls provided by software.

Currently, when a visual programming solution is adopted, an object preview mode may be selected in a programming interface first, to enter an object preview interface. After an object A is selected in the object preview interface, a jump to a role panel corresponding to the object A may be made. When a viewed object needs to be switched, a return to the object preview interface is first made, and an object B is then selected. In this case, a jump to a role panel corresponding to the object B may be made.

However, use of the foregoing visual programming method still has problems, such as when a user switches objects, role panels frequently pop up. On the one hand, it is not convenient for the user to quickly switch different viewed objects. On the other hand, a system is caused to establish excessive popup tasks. As a result, a calculation amount of the system is increased, and the system performance is degraded.

SUMMARY

According to an exemplary aspect, in an object switching method based on visual programming that is applicable to a terminal device, an object switching instruction is obtained with circuitry of the terminal device and through an object management region of a target interface. The object switching instruction carries an object identifier of a first object. According to the object switching instruction, a second operable interface corresponding to a second object is switched by the circuitry of the terminal device to a first operable interface corresponding to the first object in a visual layout region of the target interface. According to the object switching instruction, a programmable interface corresponding to the second object is switched by the circuitry of the terminal device to a programmable interface corresponding to the first object in a visual programming region of the target interface. The first object and the second object are comprised in the object management region, and the first object and the second object have different object identifiers.

According to an exemplary aspect, an object switching apparatus based on visual programming includes processing circuitry configured to obtain an object switching instruction through an object management region of a target interface, the object switching instruction carrying an object identifier of a first object. The circuitry switches, according to the object switching instruction obtained, a second operable interface corresponding to a second object to a first operable interface corresponding to the first object in a visual layout region of the target interface. The circuitry also switches, according to the object switching instruction, a programmable interface corresponding to the second object to a programmable interface corresponding to the first object in a visual programming region of the target interface. The first object and the second object are comprised in the object management region, and the first object and the second object have different object identifiers.

According to an exemplary aspect, a terminal device includes processing circuitry coupled to a memory and configured to obtain an object switching instruction through an object management region of a target interface. The object switching instruction carries an object identifier of a first object. The processing circuitry is also configured to switch, according to the object switching instruction, a second operable interface corresponding to a second object to a first operable interface corresponding to the first object in a visual layout region of the target interface. The processing circuitry is further configured to switch, according to the object switching instruction, a programmable interface corresponding to the second object to a programmable interface corresponding to the first object in a visual programming region of the target interface. The first object and the second object are comprised in the object management region, and the first object and the second object have different object identifiers.

DETAILED DESCRIPTION OF EMBODIMENTS

Figure 1:
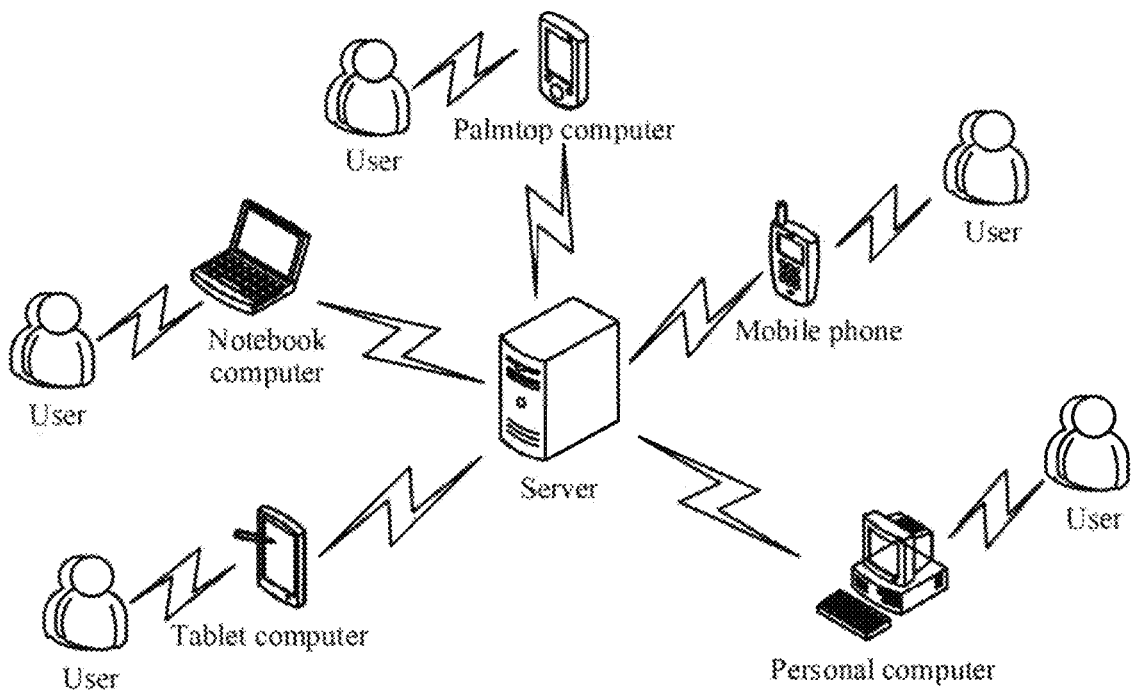
FIG. 1 is a schematic architectural diagram of a visual programming system according to an exemplary embodiment of this disclosure.

Embodiments of this application include an object switching method and apparatus and an interface presentation method and apparatus based on visual programming, so that role panels of different roles do not need to frequently pop up. On the one hand, the efficiency of viewing and switching objects is improved. On the other hand, a calculation amount of a system is reduced, and the system performance is improved.

In the specification, claims, and accompanying drawings of this application, the terms "first", "second", "third", "fourth", and the like (if existing) are intended to distinguish between similar objects rather than describe a specific sequence or a precedence order. It is to be understood that the data used in this way may be interchanged in an appropriate case, so that the embodiments of this application described herein can be implemented in a sequence other than the sequence illustrated or described herein. In addition, the terms "include", "corresponding to" and any other variants are intended to cover the non-exclusive inclusion. For example, a process, method, system, product, or device that includes a series of steps or units is not necessarily limited to those expressly listed steps or units, but may include other steps or units not expressly listed or inherent to such a process, method, product, or device.

It may be understood that, the terms "first", "second", and the like used in this application may be used for describing various concepts in this specification. However, the concepts are not limited by the terms unless otherwise specified. The terms are merely used for distinguishing one concept from another concept. For example, without departing from the scope of this application, a first object may be referred to as a second object, and similarly, the second object may be referred to as the first object. The term "at least one" used in this application includes one or more, and a quantity of at least one is an integer. For example, the at least one may be 1, 2, 3, or the like. The term "a plurality of" used in this application includes two or more, and a quantity of the plurality is an integer. For example, the plurality may be 2, 3, 4, or the like. The term "each" used in this application refers to each of a plurality of corresponding ones. For example, a plurality of objects are three objects, and each of the plurality of objects refers to each of the three objects. The term "any" used in this application refers to any one of a plurality of corresponding ones. For example, a plurality of objects are three objects, and any one of the plurality of objects refers to any one of the three objects, which may be a first one, a second one, or a third one.

It is to be understood that, this application is applicable to a visual programming client, or applicable to a game client. For example, a user operates an object X in a region A on a game interface, and a region B and a region C on the interface are linked for presentation. When operating an object Y in the region A, the user does not need to exit from the interface, but switches, in the region B and the region C, content related to the object Y, and the region B and the region C remain linked. Description is made by using an example in which this application is applicable to the visual programming client. It may be understood that, this is not to be understood as a limitation on this disclosure.

Visual programming has at least three basic features. First, a visual graphical user interface (GUI) design is adopted. Second, a programming mode of an object-oriented method is used. Third, an event-driven program running mode is adopted. In an application program of the visual programming, each graphical interface element (for example, a dialog box, a menu, a command button, or a text box) is visible on a client during design. That is, "what you see is what you get". A user may directly construct interface elements on the client according to specific user interface design requirements, and it is not necessary to design a large amount of code for the interface elements.

Figure 2:
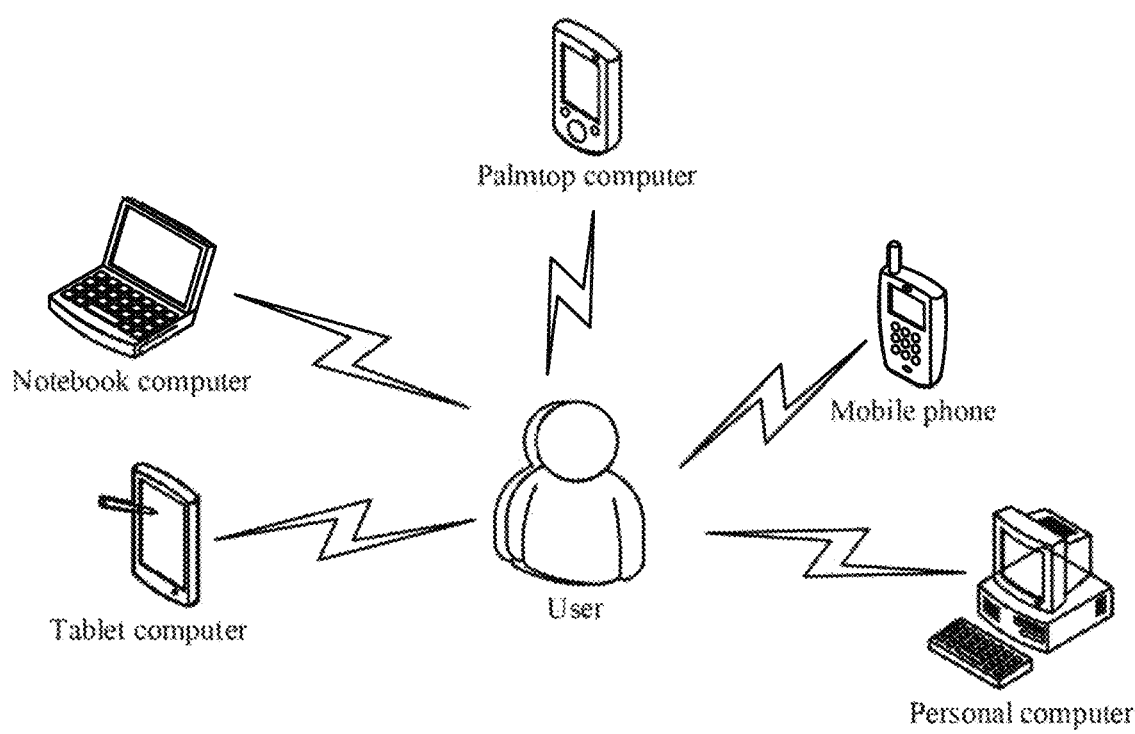
FIG. 2 is another schematic architectural diagram of a visual programming system according to an exemplary embodiment of this disclosure.

For ease of understanding, this application provides an object switching method based on visual programming and an interface presentation method based on visual programming. The foregoing methods are applicable to a visual programming system shown in FIG. 1, or applicable to a visual programming system shown in FIG. 2. FIG. 1 is a schematic architectural diagram of a visual programming system according to an exemplary embodiment of this disclosure. As shown in FIG. 1, in a networked state, a user programs an applet, a game, chat software, or another application program through a client in the visual programming system. After the programming is completed, programmed content is synchronously or asynchronously transmitted to a server in the visual programming system in the networked state, and the programmed content is stored by the server, for subsequent processing. FIG. 2 is another schematic architectural diagram of a visual programming system according to an exemplary embodiment of this application. As shown in FIG. 2, in a non-networked state, a user programs an applet, a game, chat software, or another application program through a client in the visual programming system. After the programming is completed, programmed content is stored in the client locally. The client is deployed on a terminal device. The terminal device includes, but not limited to, a tablet computer, a notebook computer, a palmtop computer, a mobile phone, a speech interaction device, and a personal computer (PC), and is not limited herein.

Figure 3:
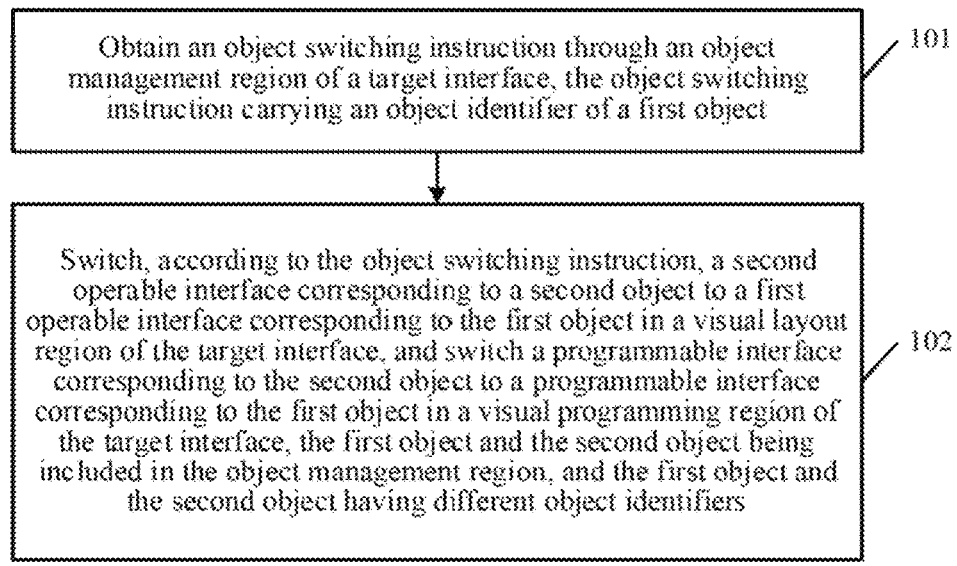
FIG. 3 is a schematic diagram of an exemplary object switching method based on visual programming according to an exemplary embodiment of this disclosure.

The object switching method based on visual programming in this application is described below with reference to the foregoing description. Referring to FIG. 3, an exemplary embodiment of the object switching method based on visual programming includes the following steps.

In step 101, an object switching instruction is obtained through an object management region of a target interface. The object switching instruction carries an object identifier of a first object.

In an exemplary embodiment, the terminal device obtains the object switching instruction through the object management region of the target interface. On the terminal device, a client is deployed, for example, a visual programming client may be deployed.

It may be understood that a manner of triggering the object switching instruction includes, but not limited to, selecting a to-be-switched object (for example, the first object) in a single-click manner in the object management region, or selecting a to-be-switched object (for example, the first object) in a double-click manner in the object management region, or selecting a to-be-switched object (for example, the first object) in a long press manner in the object management region, or moving a to-be-switched object (for example, the first object) out of the object management region in a dragging manner, or triggering the object switching instruction in a sound control manner, or selecting a to-be-switched object (for example, the first object) by using a preset gesture in the object management region. For example, a triangular region is drawn on an icon corresponding to the first object, indicating that the first object is selected.

Figure 4:
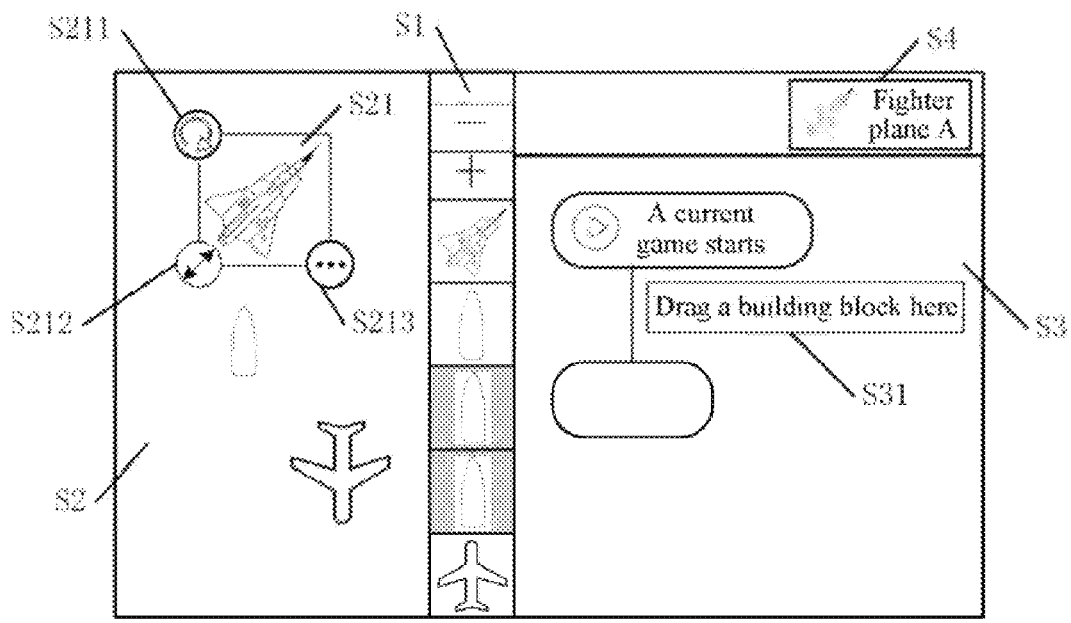
FIG. 4 is a schematic diagram of an exemplary target interface according to an exemplary embodiment of this disclosure.

For ease of description, referring to FIG. 4, FIG. 4 is a schematic diagram of an embodiment of a target interface according to an exemplary embodiment of this disclosure. As shown in FIG. 4, a region indicated by S1 is the object management region. "+" displayed on the object management region represents a material addition control. That is, a new material may be added by selecting the material addition control. "–" displayed on the object management region represents a material deletion control. That is, the new material may be deleted by selecting the material deletion control. In addition, a background-colorless icon displayed on the object management region represents an object that is currently visible, and a background-colored icon displayed on the object management region represents an object that is currently invisible.

A region indicated by S2 is a visual layout region, and visible objects, for example, two fighter planes and a bullet in FIG. 4, are displayed in the visual layout region. When a fighter plane A is selected in the object management region, an operable interface corresponding to the fighter plane A, that is, a region indicated by S21, appears. There are three selectable icons on the operable interface. An icon indicated by S211 is used for controlling the fighter plane A to rotate, an icon indicated by S212 is used for controlling the fighter plane A to scale, and an icon indicated by S213 is used for presenting a function interface for controlling the fighter plane A. It may be understood that, when an object is displayed in the visual layout region, the object may be alternatively selected directly in the visual layout region. For example, when the fighter plane A is selected in the visual layout region, the operable interface corresponding to the fighter plane A appears.

A region indicated by S3 is a visual programming region, and the visual programming region includes a programmable interface indicated by S31. Programming may be performed by only dragging a building block, that is, dragging a building block into the programmable interface, without using code in the visual programming region. The building block may refer to a rectangular block structure used for replacing a code snippet in the visual programming, similar to a toy building block. Building blocks may be specifically classified into an event building block and a functional building block. The event building block is used for describing logic, that is, is a logic block that is triggered when an event occurs. The functional building block is used for performing some functions, for example, behaviors such as movement and rotation.

A region indicated by S4 is an information display region of a currently selected material, and the fighter plane A is selected in FIG. 4. Therefore, an icon and text description of the fighter plane A are presented in the information display region, so that the user may see the selected object with half an eye. A thumbnail of the object, a name of the object, and corresponding operation entrances such as an object editing entrance, an object deletion entrance, and an object hiding entrance are displayed in the information display region.

In step 102, according to the object switching instruction, a second operable interface corresponding is switched to a second object to a first operable interface corresponding to the first object in a visual layout region of the target interface, and a programmable interface corresponding to the second object is switched to a programmable interface corresponding to the first object in a visual programming region of the target interface. The first object and the second object are included in the object management region, and the first object and the second object have different object identifiers.

In an exemplary embodiment, the terminal device first presents the target interface related to the second object. The user focuses on one object for programming on the target interface each time. When the user needs to program the first object, the user may trigger the object switching instruction through the object management region of the target interface, for example, by clicking on the icon of the first object. In this case, the object switching instruction carries the object identifier of the first object. The terminal device determines to switch the first object according to the object identifier carried in the object switching instruction. Therefore, the interface corresponding to the second object is switched to the interface corresponding to the first object simultaneously in the visual layout region and the visual programming region of the target interface.

It may be understood that, a manner of selecting the first object includes, but not limited to, selecting the first object in a single-click manner in the object management region, or selecting the first object in a double-click manner in the object management region, or selecting the first object in a long press manner in the object management region, or moving the first object out of the object management region in a dragging manner, or triggering the object switching instruction in a sound control manner, or selecting the first object by using a preset gesture in the object management region. For example, a triangular region is drawn on the icon corresponding to the first object, indicating that the first object is selected.

Figure 5:
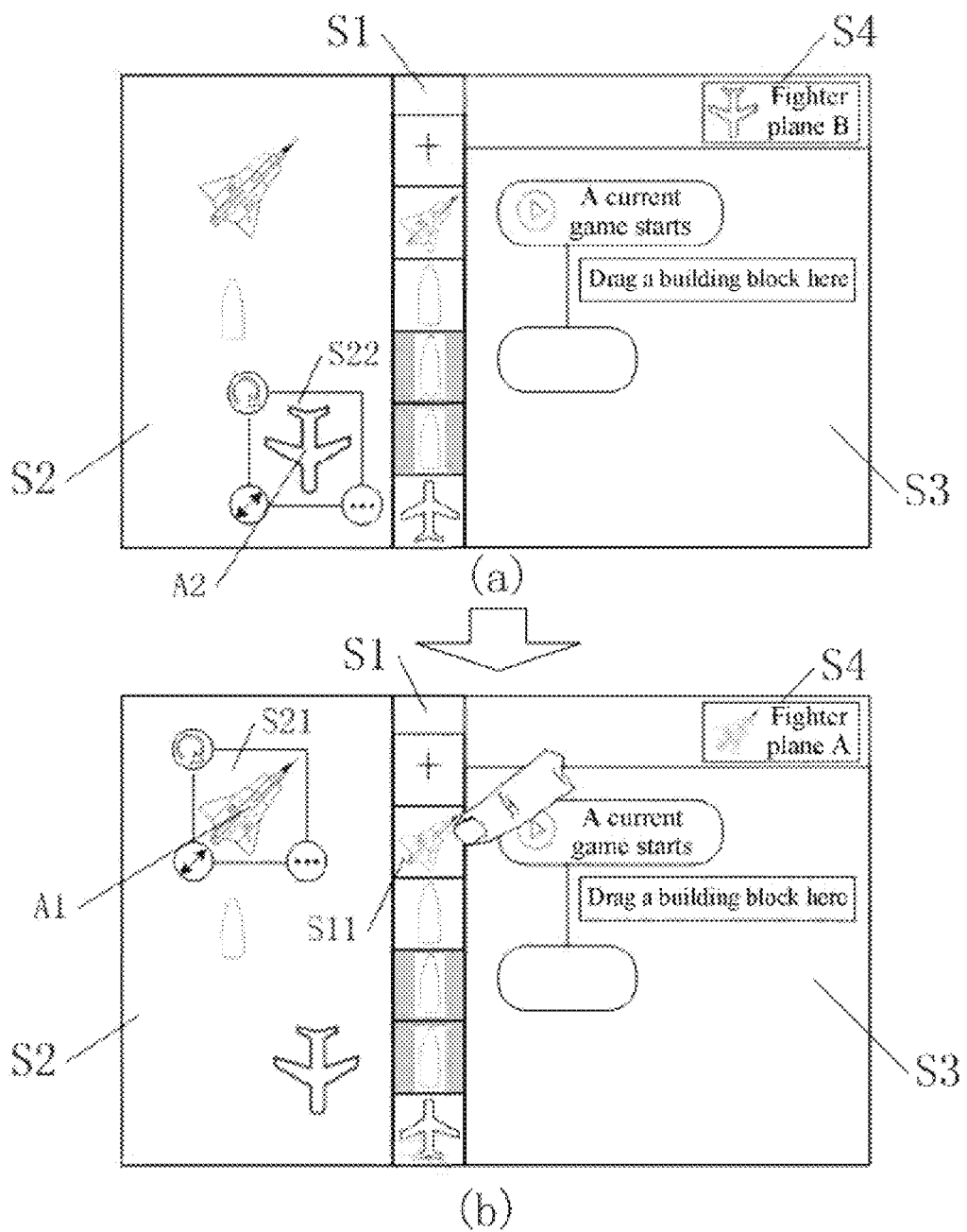
FIG. 5 is a schematic diagram of an exemplary switching an object according to an object switching instruction according to an exemplary embodiment of this disclosure.

For ease of description, FIG. 5 is a schematic diagram of switching an object according to an object switching instruction according to an exemplary embodiment of this disclosure. As shown in FIG. 5, a programmable interface and an operable interface that correspond to a second object A2 (that is, a fighter plane B) are presented in (a) in FIG. 5. The operable interface of the second object A2 (that is, the fighter plane B) is an interface indicated by S22, and the programmable interface of the second object A2 (that is, the fighter plane B) is an interface indicated by S3, and a thumbnail and a name of the second object A2 (that is, the fighter plane B) are presented in an information display region indicated by S4. When the user clicks on an icon corresponding to a first object A1 (that is, a fighter plane A) in the object management region, an object switching instruction is triggered. The object switching instruction carries an object identifier of the first object A1 (that is, the fighter plane A). Optionally, the user selects the icon indicated by S11 from the object management region indicated by S1. The terminal device switches the interface shown in (a) in FIG. 5 to the interface shown in (b) in FIG. 5 according to the object switching instruction. It can be seen from the figure that, a programmable interface and an operable interface that correspond to the first object A1 (that is, the fighter plane A) are presented in (b) in FIG. 5. The operable interface of the first object A1 (that is, the fighter plane A) is the interface indicated by S21, and the programmable interface of the first object A1 (that is, the fighter plane A) is the interface indicated by S3, and a thumbnail and a name of the first object A1 (that is, the fighter plane A) are presented in the information display region indicated by S4.

It may be understood that, in an actual situation, after the object switching is completed, there are a plurality of different object presentation manners in the visual layout region. A first manner is global switching. That is, if the second object A2 (for example, the fighter plane B) has a relatively large coverage range in the visual layout region, it may be possible to fail to simultaneously see the complete first object A1 (that is, the fighter plane A) in the visual layout region S2. In this case, the first operable interface S21 and the second operable interface S22 do not coexist, and only an operable interface corresponding to an object after being switched is seen in the visual layout region S2. The second manner is local switching. That is, if the second object A2 (for example, the fighter plane B) has only a relatively small coverage range in the visual layout region, after the second object is switched to the first object A1 (that is, the fighter plane A), the first object A1 (that is, the fighter plane A) and the second object A2 (for example, the fighter plane B) may appear simultaneously in the visual layout region S2. That is, the first operable interface S21 and the second operable interface S22 may coexist in the visual layout region S2. In this case, an operation originally focused on the second object A2 (for example, the fighter plane B) is switched to an operation focused on the first object A1 (for example, the fighter plane A).

In an exemplary embodiment of this disclosure, the object switching method based on visual programming is provided. First, an object switching instruction is obtained through an object management region of a target interface. The object switching instruction carries an object identifier of a first object. Then, a second operable interface corresponding to a second object is switched to a first operable interface corresponding to the first object in a visual layout region of the target interface according to the object switching instruction, and a programmable interface corresponding to the second object is switched to a programmable interface corresponding to the first object in a visual programming region of the target interface. The second object and the first object have different object identifiers, and the programmable interface corresponds to the first object and the first operable interface corresponding to the first object being corresponding to the object identifier of the first object. By using the foregoing manner, during visual programming, when being switching an object, the user directly switches to a programmable interface and an operable interface that correspond to the object on a target interface, and a linkage between both of the two interfaces for switching states is achieved, so that role panels of different roles do not need to frequently pop up. On the one hand, the efficiency of viewing and switching the objects is improved. On the other hand, a calculation amount of the system is reduced, and the system performance is improved.

Optionally, based on the foregoing exemplary embodiment corresponding to FIG. 3, in a first optional embodiment of the object switching method based on visual programming provided in this embodiment of this application, the method may further include the following steps. In a first step, a region hiding instruction is obtained, and in a second step, the object management region on the target interface according to the region hiding instruction.

Figure 6:
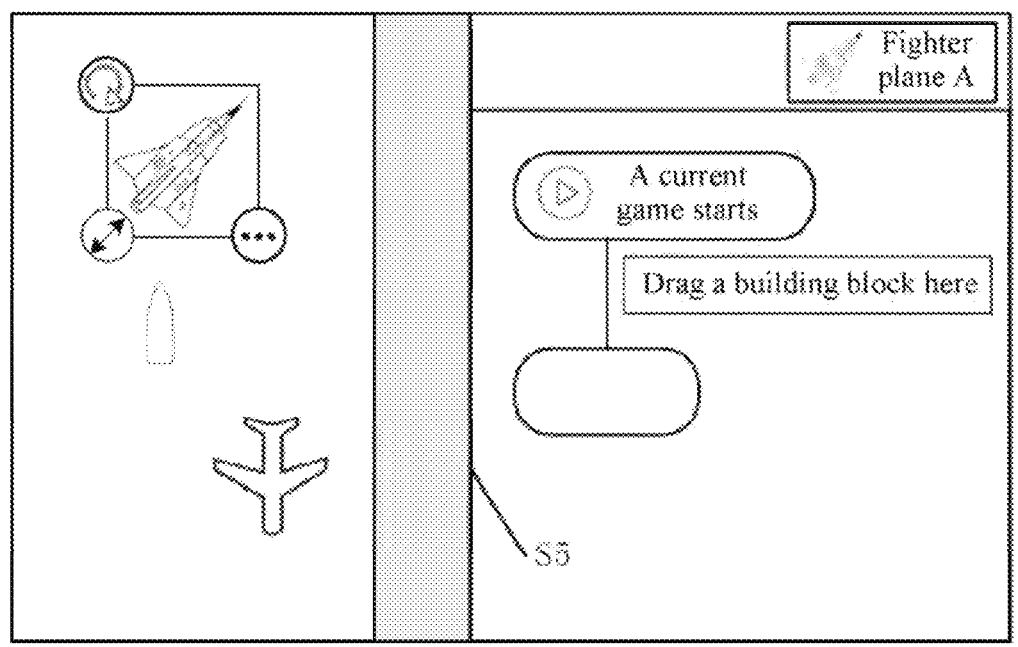
FIG. 6 is a schematic diagram of an exemplary hiding of an object management region on a target interface according to an exemplary embodiment of this disclosure.

In an exemplary embodiment, a method for hiding the object management region is described. For ease of description, FIG. 6 is a schematic diagram hiding an object management region on a target interface according to an exemplary embodiment of this disclosure. As shown in FIG. 6, when a user triggers the region hiding instruction, the terminal device hides the object management region according to the region hiding instruction, so that the object management region is not displayed on the target interface. A region indicated by S5 is a region formed after the object management region is hidden. In this case, the visual layout region may be expanded to the region covered by S5, or the visual programming region may be expanded to the region covered by S5, or both the visual layout region and the visual programming region may be expanded to the region covered by S5, or neither the visual programming region nor the visual layout region is expanded. A manner of processing the region indicated by S5 is not limited herein.

It can be understood that, a manner of triggering the region hiding instruction includes, but not limited to, double-clicking any position in the target interface, or performing an upward sliding operation in the object management region, or performing an operation according to a preset gesture in the target interface, or triggering the region hiding instruction in a sound control manner.

Further, in an exemplary embodiment of this disclosure, a method for hiding an object management region is provided. That is, the user may further initiate a region hiding instruction through the target interface. After obtaining the region hiding instruction, the terminal device hides the object management region on the target interface according to the region hiding instruction. By using the foregoing manner, the object management region is hidden when the object management region is not required for use. Therefore, a position occupied by the object management region is vacated, so that the visual layout region and/or the visual programming region is enlarged, thereby improving the convenience of operations, and also optimizing the target interface.

Optionally, based on the foregoing exemplary embodiment corresponding to FIG. 3, in a second optional embodiment of the object switching method based on visual programming provided in this embodiment of this application, before the obtaining an object switching instruction through an object management region of a target interface, the method may further the following steps. In a first step, a region display instruction is obtained, and in a second step, according to the region display instruction, the object management region is presented on the target interface in a form of a sub-interface that is displayed independent of the target interface, or the object management region is presented in a preset region of the target interface in an embedded form according to the region display instruction.

Optionally, in the first manner, the sub-interface is another interface independent of the target interface, and is not affected by a position change and a size change of the target interface. The sub-interface is used for presenting the object management region. Optionally, in the second manner, the target interface is provided with a preset region. The preset region is a part of the target interface, and may be correspondingly changed along with the position change and the size change of the target interface. The preset region is used for presenting the object management region.

Figure 7:
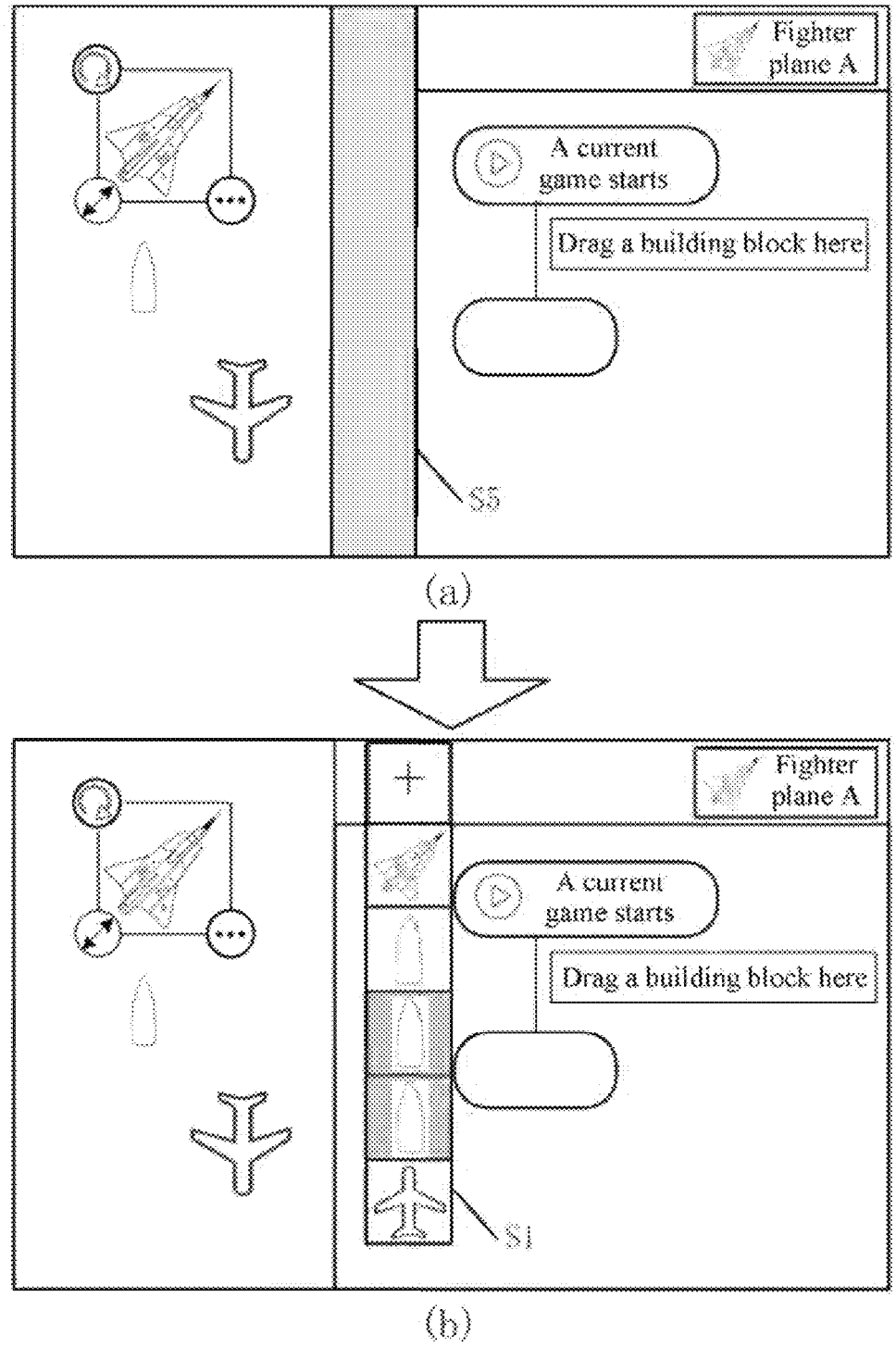
FIG. 7 is a schematic diagram of an exemplary presenting of an object management region in a form of a sub-interface that is displayed independent of the target interface according to an exemplary embodiment of this disclosure.

In an exemplary embodiment, two manners of presenting the object management region are described. The first manner is presenting the object management region on the target interface in a form of a sub-interface that is displayed independent of the target interface. Optionally, the form of a sub-interface that is displayed independent of the target interface may be a form of a floating window. For ease of understanding FIG. 7 is a schematic diagram of presenting an object management region in a form of a floating window according to an exemplary embodiment of this disclosure. As shown in FIG. 7, the region indicated by S5 in (a) represents a region formed after the object management region is hidden. When the user initiates the region display instruction, the object management region is presented on the target interface in the form of a sub-interface that is displayed independent of the target interface. That is, the object management region indicated by S1 in (b) in FIG. 7 is in a representation form of the floating window. The floating window belongs to display of a small window or a floating function, the object management region may be floated in the target interface, and the floating window may be further used for beautifying the target interface.

Figure 8:
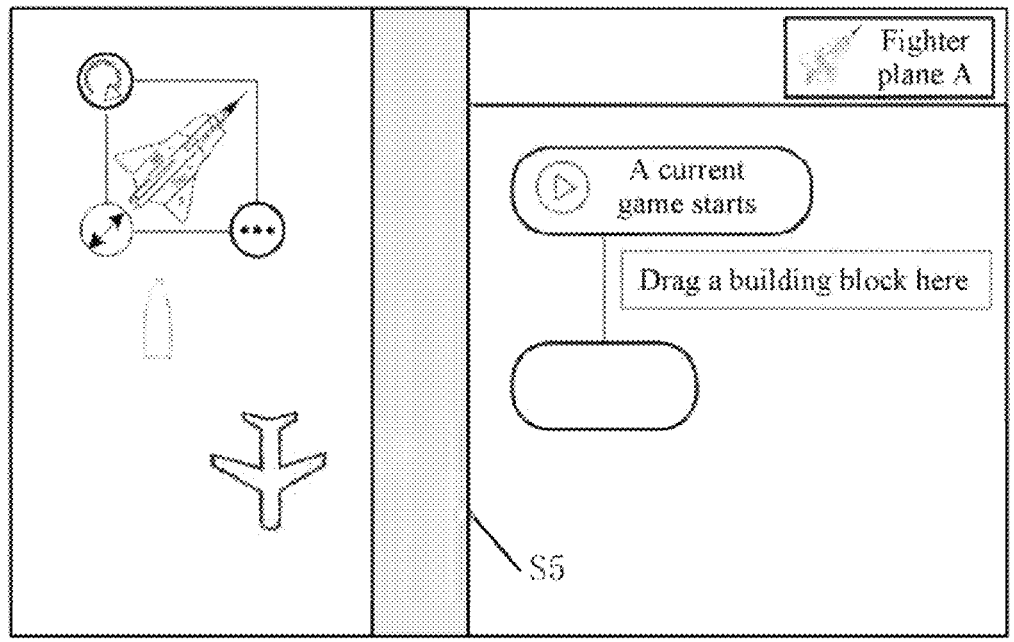
FIG. 8 is a schematic diagram of an exemplary presenting of an object management region in an embedded form according to an exemplary embodiment of this disclosure.
Figure 8:
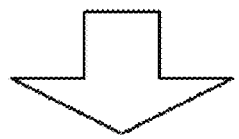
Figure 8:
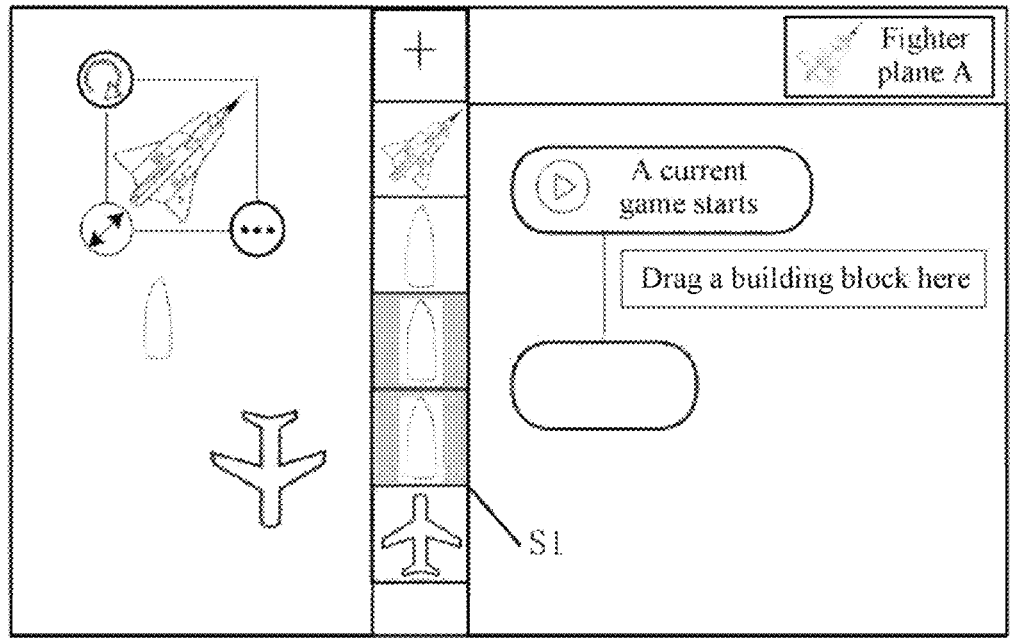

The second manner is presenting the object management region on the target interface in the embedded manner. For ease of understanding, FIG. 8 is a schematic diagram of presenting an object management region in an embedded form according to an exemplary embodiment of this disclosure. As shown in FIG. 8, the region indicated by S5 in (a) represents a region formed after the object management region is hidden. That is, S5 indicates a preset region. When the user initiates a region display instruction, the object management region is presented in the embedded form on the preset region. The object management region indicated by S1 in (b) in FIG. 8 is in a representation form after the preset region is embedded.

It can be understood that, a manner of triggering the region display instruction includes, but not limited to, double-clicking any position in the target interface, or performing an upward sliding operation in the target interface, or performing an operation according to a preset gesture in the target interface, or triggering the region display instruction in a sound control manner.

Further, in an exemplary embodiment of this disclosure, two manners of presenting the object management region are provided. Before the obtaining an object switching instruction through an object management region of a target interface, a region display instruction may be further obtained, the object management region is then presented, according to the region display instruction, on the target interface in a form of a sub-interface that is displayed independent of the target interface. The object management region is presented in a preset region of the target interface in an embedded form according to the region display instruction. By using the foregoing manner, the object management region may be presented in different forms. The visual layout region and the visual programming region may not be occupied by presenting the object management region in the form of a sub-interface that is displayed independent of the target interface, and the object management region may be more stably presented by presenting the object management region in the embedded form, thereby improving the flexibility and feasibility of the solution.

Optionally, based on the foregoing embodiment corresponding to FIG. 3, in a third optional embodiment of the object switching method based on visual programming provided in this embodiment of this application, the method may further include the following steps. In a first step, N to-be-programmed objects are displayed through the object management region. N is an integer greater than or equal to 1. In a second step, a region sliding instruction is obtained through the object management region, and in a third step, M to-be-programmed objects are displayed in the object management region according to the region sliding instruction. The M to-be-programmed objects and the N to-be-programmed objects have K identical to-be-programmed objects. M is an integer greater than or equal to 1, and K is an integer greater than or equal to 0 and less than N.

Optionally, the region sliding instruction includes a sliding distance, and a movement distance of the to-be-programmed object may be determined according to the sliding distance. In this case, the to-be-programmed object is moved according to the movement distance, so that some to-be-programmed objects in the N to-be-programmed objects that are originally displayed are moved out of the object management region, and new to-be-programmed objects are moved into the object management region. Therefore, the N to-be-programmed objects displayed in the object management region become M to-be-programmed objects according to the region sliding instruction. The M to-be-programmed objects and the N to-be-programmed objects have K identical to-be-programmed objects, and the K identical to-be-programmed objects are to-be-programmed objects that are not moved out of the object management region in the original N to-be-programmed objects.

Figure 9:
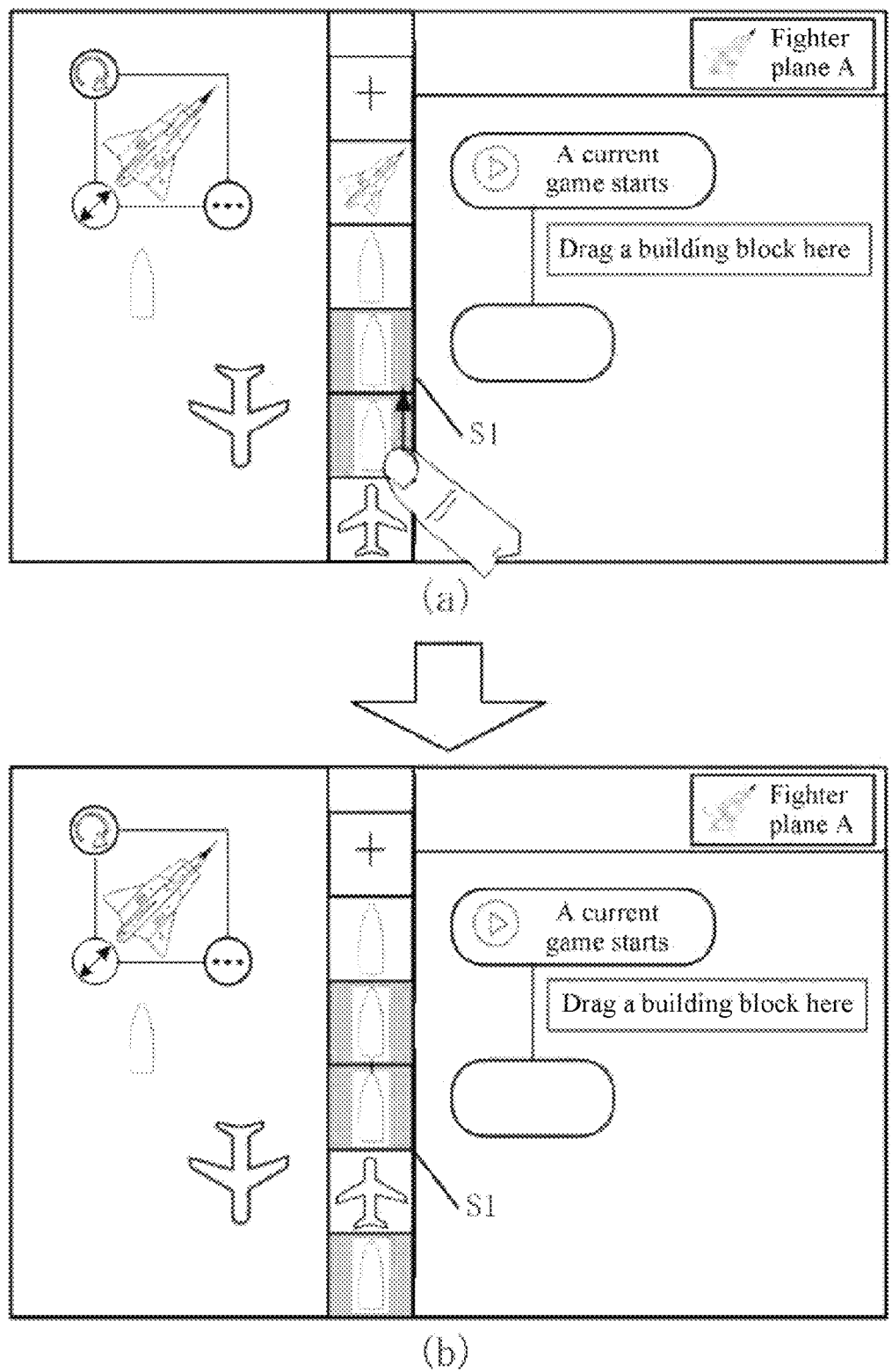
FIG. 9 is a schematic diagram of an exemplary performing of a sliding operation in an object management region according to an exemplary embodiment of this disclosure.

In an exemplary embodiment, a method for operating the object management region is described. For ease of description, description is made below with reference to FIG. 9. FIG. 9 is a schematic diagram of performing a sliding operation in an object management region according to an exemplary embodiment of this disclosure. N to-be-programmed objects, for example, five to-be-programmed objects, that is, two fighter planes and three bullets, are presented in the object management region indicated by S1 in (a) in FIG. 9. The user may perform upward sliding in the object management region, that is, trigger the region sliding instruction, to enter the object management region indicated by S1 in (b) in FIG. 9. M to-be-programmed objects, for example, five to-be-programmed objects, that is, one fighter plane and four bullets, are presented in the object management region at this point. The M to-be-programmed objects and N to-be-programmed objects have K identical to-be-programmed objects, and K is 4.

It may be understood that, the user may further perform downward sliding in the object management region, that is, trigger the region sliding instruction. In this case, the to-be-programmed objects in the object management region also change.

Further, in an exemplary embodiment of this disclosure, a method for viewing an object by sliding in an object management region is provided. That is, a region sliding instruction is first obtained through the object management region. The object management region is used for presenting N to-be-programmed objects. M to-be-programmed objects are then displayed in the object management region according to the region sliding instruction. The M to-be-programmed objects and the N to-be-programmed objects have K identical to-be-programmed objects. By using the foregoing manner, the user may view different objects in the object management region in a sliding and dragging manner. That is, content in the object management region may change according to requirements of the user, thereby improving the flexibility and operability of operations.

Optionally, based on the foregoing exemplary embodiment corresponding to FIG. 3, in a fourth optional embodiment of the object switching method based on visual programming provided in an exemplary embodiment of this disclosure, the method may further include the following steps. In a first step, in a case that a first mode switching instruction is obtained, an object management region corresponding to a first mode on the target interface is displayed according to the first mode switching instruction. In a second step, in a case that a second mode switching instruction is obtained, an object management region corresponding to a second mode on the target interface is displayed according to the second mode switching instruction. The first mode and the second mode are two different interface presentation modes.

In an exemplary embodiment, a mode switching method corresponding to the target interface is described. Optionally, the target interface has different arrangement manners, that is, has different modes. The target interface provided in this application has two modes. One is a first mode, that is, a full mode. The other is a second mode, that is, a brief mode (which may alternatively be referred to as a mini mode). As the name implies, in the full mode, more information related to the to-be-programmed object is presented in the object management region, while in the brief mode, less information related to the to-be-programmed object is displayed in the object management region.

Figure 10:
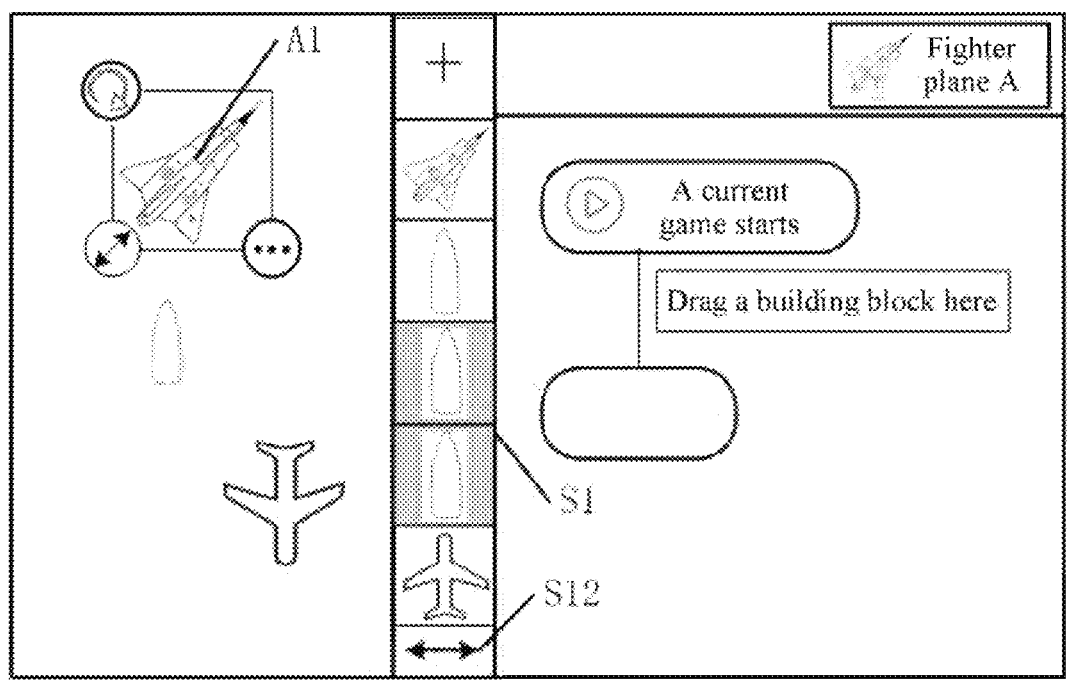
FIG. 10 is a schematic diagram of an exemplary selecting of an interface presentation mode according to an exemplary embodiment of this disclosure.

For ease of description, FIG. 10 is a schematic diagram of selecting an interface presentation mode according to an exemplary embodiment of this disclosure. As shown in FIG. 10, the icon indicated by S12 is clicked in the object management region indicated by S1. That is, a mode switching instruction is triggered. Optionally, when the user clicks the icon indicated by S2 once, a first mode switching instruction is triggered, and the terminal device may present an object management region corresponding to the first mode on the target interface according to the first mode switching instruction. That is, the object management region in the full mode is displayed. When the user clicks the icon indicated by S12 again, a second mode switching instruction is triggered, and the terminal device may present an object management region corresponding to the second mode on the target interface according to the second mode switching instruction. That is, the object management region in the brief mode is displayed.

Further, in an exemplary embodiment of this disclosure, a method for switching modes is provided. An object management region corresponding to a first mode is presented on the target interface according to a first mode switching instruction in a case that the first mode switching instruction is obtained, and an object management region corresponding to a second mode is presented on the target interface according to a second mode switching instruction in a case that the second mode switching instruction is obtained. The first mode and the second mode are two different interface presentation modes. By using the foregoing manner, the user may select, according to operating habits and actual requirements, a corresponding mode to operate. One is the full mode, and the other is the brief mode. Flexible switching between the two modes is possible as one of ordinary skill would recognize.

Optionally, based on the foregoing fourth exemplary embodiment corresponding to FIG. 3, in a fifth optional embodiment of the object switching method based on visual programming provided in an exemplary embodiment of this disclosure, the presenting an object management region corresponding to a first mode on the target interface may include the following steps. In a first step, a first object management region is presented on the target interface. The first object management region includes icon information and text information of a to-be-programmed object.

Optionally, on the basis of presenting a first object management region on the target interface, an object attribute presentation instruction may be obtained through the first object management region. The object attribute presentation instruction carries an object identifier of a first object. An object attribute interface of the first object is presented in the target interface according to the object attribute presentation instruction. The object attribute interface includes attribute information associated with the first object.

Figure 11:
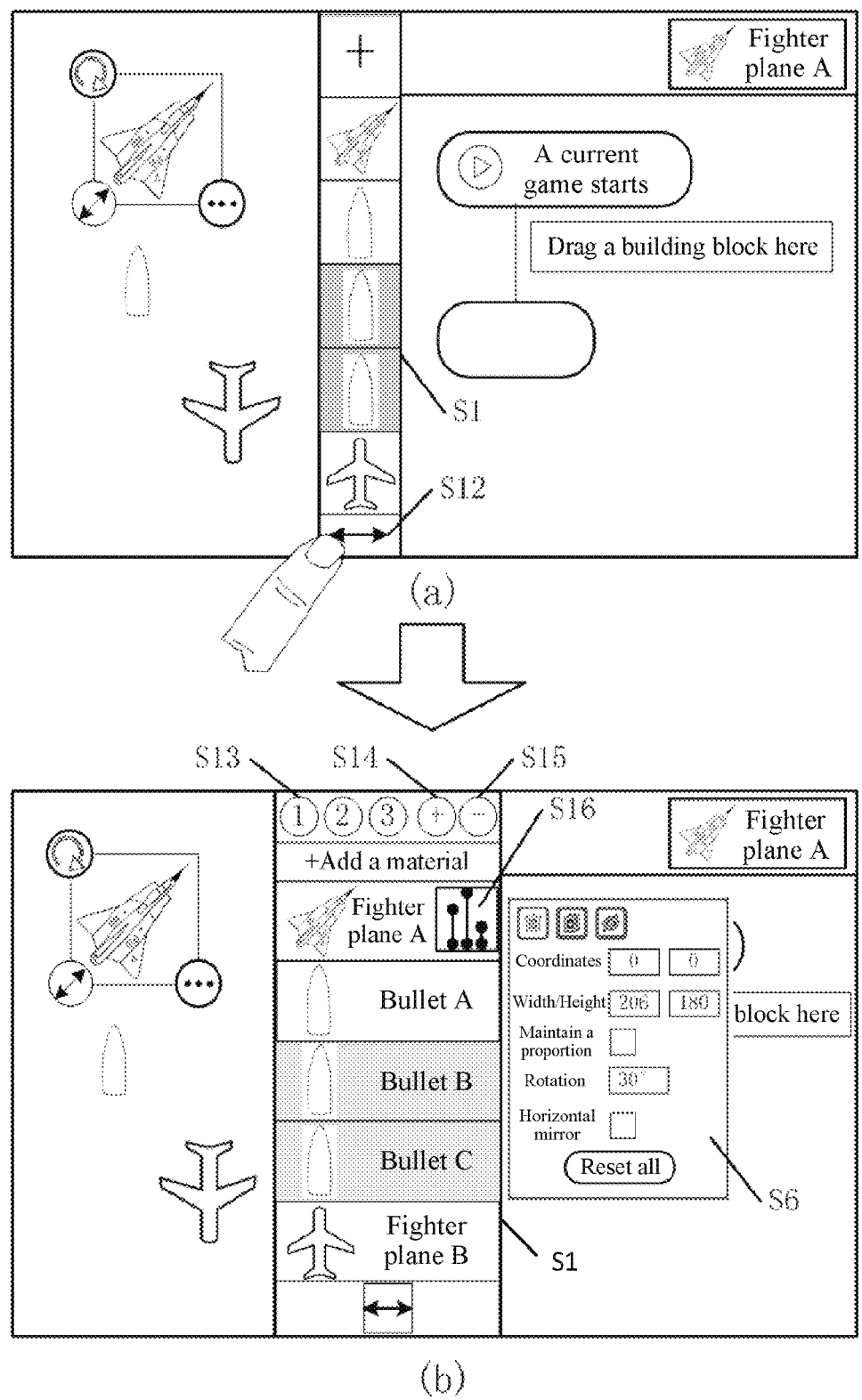
FIG. 11 is a schematic diagram of an exemplary target interface in a first mode according to an exemplary embodiment of this disclosure.

In an exemplary embodiment, a manner of entering a target interface in a full mode is described. For ease of description, FIG. 1 is a schematic diagram of a target interface in a first mode according to an exemplary embodiment of this disclosure. As shown in FIG. 11, in (a), when the icon indicated by S12 is clicked in the object management region indicated by S1, a first mode switching instruction is triggered, and the terminal device may present a first object management region corresponding to the first mode on the target interface according to the first mode switching instruction. That is, the object management region in the full mode is displayed. A region indicated by S1 in (b) in FIG. 11 is the first object management region. Icon information and text information of the to-be-programmed objects, for example, icon information and a corresponding text of the fighter plane A, are presented in the first object management region. Next, an object attribute presentation instruction may be further obtained through the first object management region. For example, an icon indicated by S16 is clicked, that is, the object attribute presentation instruction is triggered. The object attribute presentation instruction carries an object identifier of the first object A1. If the first object A1 is the fighter plane A, an object attribute interface of the first object A1, that is, the object attribute interface indicated by S6, pops up on the target interface according to the object attribute presentation instruction. The object attribute interface includes attribute information associated with the first object A1, which may include a coordinate position, a width, a height, whether a proportion is maintained, a rotation angle, and whether a horizontal mirror is selected for the first object A1 (for example, the fighter plane A). In addition, operations such as deletion, copying, hiding, or restoring all parameters may be further performed on the first object A1 (for example, the fighter plane A).

Sub-figure (b) in FIG. 11 further shows icons corresponding to S13, S14, and S15. The icon indicated by S13 is a page selection entrance, the icon indicated by S14 is a page addition entrance, and the icon indicated by S15 is a page deletion entrance.

Further, in an exemplary embodiment of this disclosure, a target interface corresponding to a full mode is provided. That is, a first object management region is presented on the target interface. The first object management region includes icon information and text information of a to-be-programmed object. An object attribute presentation instruction is then obtained through the first object management region. An object attribute interface of the first object is finally presented in the target interface according to the object attribute presentation instruction. The object attribute interface includes attribute information associated with the first object. By using the foregoing manner, the user may choose to enter the target interface in the full mode. In the full mode, the user may view more object information, to assist in recording the related information of the object, and to assist in performing additional operations in the object management region.

Optionally, based on the foregoing fourth exemplary embodiment corresponding to FIG. 3, in a sixth optional embodiment of the object switching method based on visual programming provided in an exemplary embodiment of this disclosure, the presenting an object management region corresponding to a second mode on the target interface may include a step in which a second object management region is presented on the target interface. The second object management region includes icon information of a to-be-programmed object.

Optionally, on the basis of presenting a second object management region on the target interface, an object attribute presentation instruction may be obtained through a region outside the second object management region. The object attribute presentation instruction carries an object identifier of a first object. An object attribute interface of the first object is presented in the target interface according to the object attribute presentation instruction. The object attribute interface includes attribute information associated with the first object.

Figure 12:
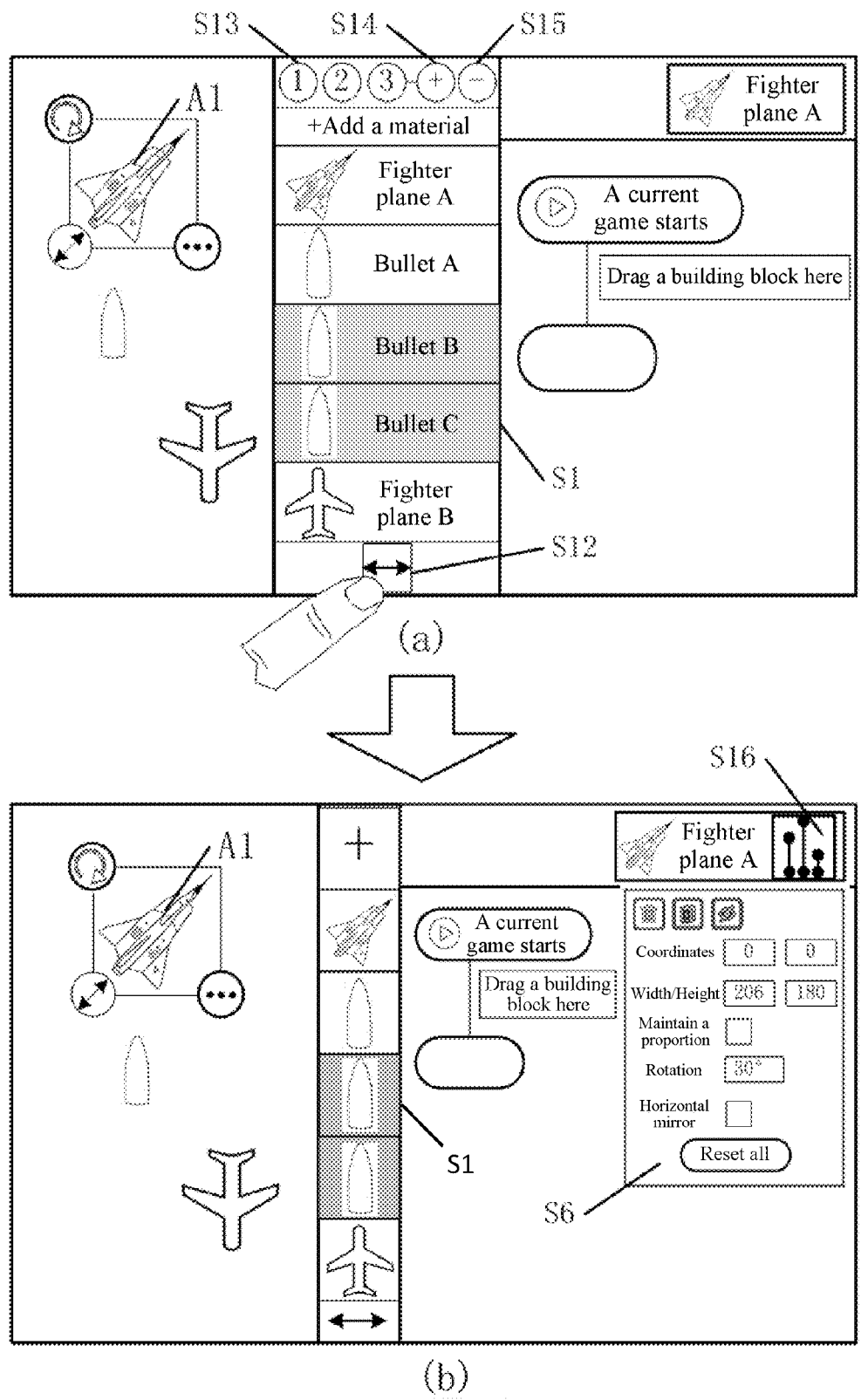
FIG. 12 is a schematic diagram of an exemplary target interface in a second mode according to an exemplary embodiment of this disclosure.

In an exemplary embodiment, a manner of entering a target interface in a brief mode is described. For ease of description, FIG. 12 is a schematic diagram of a target interface in a second mode according to an exemplary embodiment of this disclosure. As shown in FIG. 2, in (a), when the icon indicated by S12 is clicked in the object management region indicated by S1, a second mode switching instruction is triggered, and the terminal device may present a second object management region corresponding to the second mode on the target interface according to the second mode switching instruction. That is, the object management region in the brief mode is displayed. A region indicated by S1 in (b) in FIG. 12 is the second object management region. Icon information of the to-be-programmed objects, for example, icon information of the fighter plane A, is presented in the second object management region. Next, an object attribute presentation instruction may be further obtained through a region outside the second object management region. For example, the icon indicated by S16 is clicked, that is, the object attribute presentation instruction is triggered. The object attribute presentation instruction carries an object identifier of the first object A1. If the first object A1 is the fighter plane A, an object attribute interface of the first object A1, that is, the object attribute interface indicated by S6, pops up on the target interface according to the object attribute presentation instruction. The object attribute interface includes attribute information associated with the first object A1, which may include a coordinate position, a width, a height, whether a proportion is maintained, a rotation angle, and whether a horizontal mirror is selected for the first object A1 (for example, the fighter plane A). In addition, operations such as deletion, copying, hiding, or restoring all parameters may be further performed on the first object A1 (for example, the fighter plane A).

Further, in an exemplary embodiment of this disclosure, a target interface corresponding to a brief mode is provided. That is, a second object management region is presented on the target interface. The second object management region includes icon information of a to-be-programmed object. An object attribute presentation instruction is then obtained. An object attribute interface of the first object is presented in the target interface according to the object attribute presentation instruction. The object attribute interface includes attribute information associated with the first object. By using the foregoing manner, the user may freely choose to switch between the two modes, thereby saving more visual space for the programmable interface.

In an exemplary embodiment of this disclosure, the object attribute presentation instruction may be obtained through the first object management region, or the object attribute presentation instruction may be obtained through the region outside the second object management region. In addition, the object attribute presentation instruction may be alternatively obtained in other manners. For example, on the basis of presenting a first object management region on the target interface, the object attribute presentation instruction is obtained through a region outside the first object management region. Alternatively, on the basis of presenting a second object management region on the target interface, the object attribute presentation instruction is obtained through the second object management region. Alternatively, the object attribute presentation instruction may be obtained through another region in the target interface. This is not limited in this application.

Optionally, based on the foregoing fifth exemplary embodiment or sixth exemplary embodiment corresponding to FIG. 3, in a seventh optional embodiment of the object switching method based on visual programming provided in an exemplary embodiment of this application, after the presenting an object attribute interface of the first object in the target interface according to the object attribute presentation instruction, the method may further include the following steps. In a first step, a hiding presentation instruction is obtained through the object attribute interface. The hiding presentation instruction carries the object identifier of the first object. In a second step, the first object and the first operable interface corresponding to the first object are hidden in the visual layout region according to the hiding presentation instruction.

Figure 13:
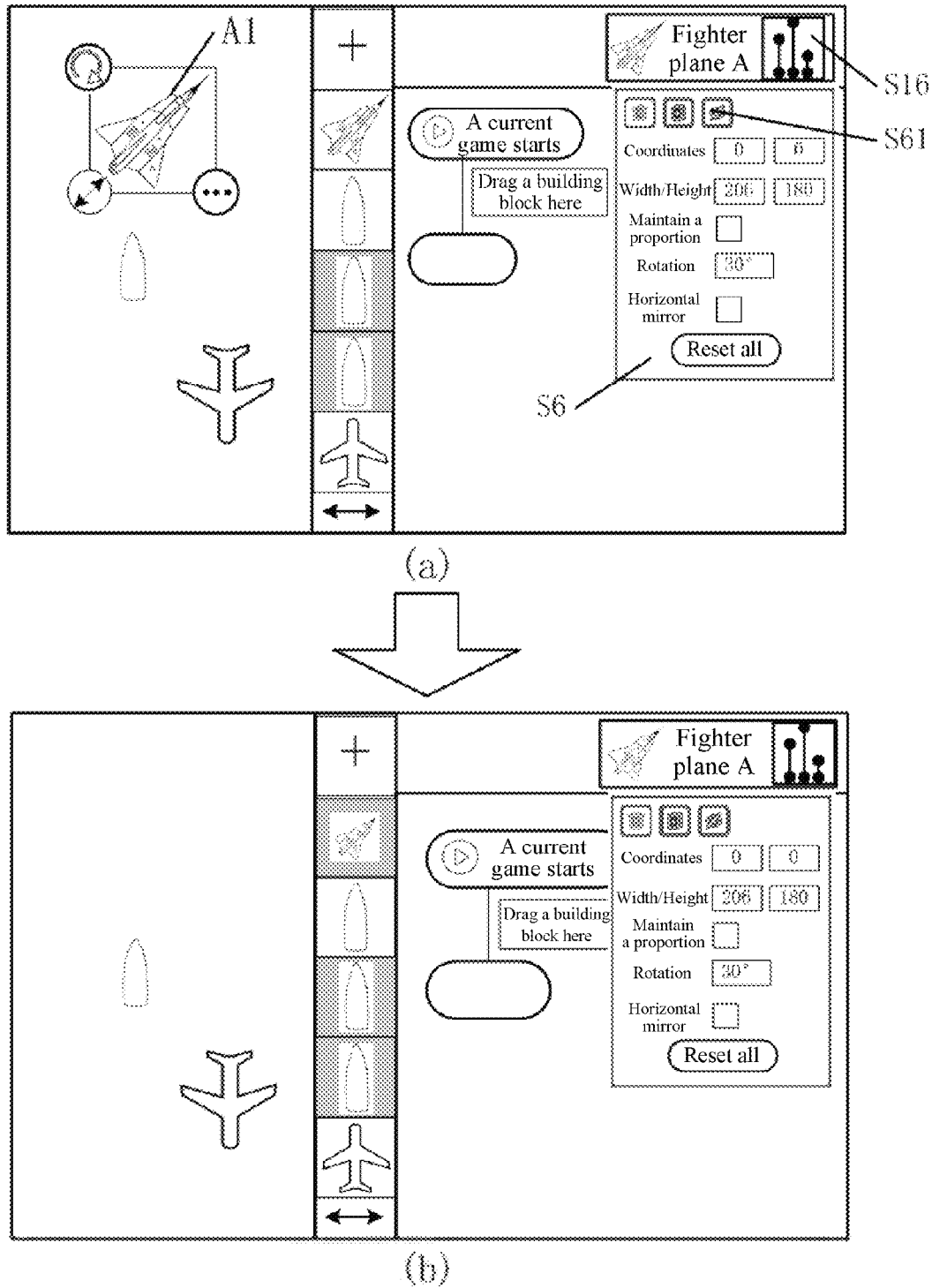
FIG. 13 is a schematic diagram of an exemplary hiding of an object in a visual layout region according to an exemplary embodiment of this disclosure.

In an exemplary embodiment, a method for hiding an object in a visual layout region is provided. For ease of description, description is made below with reference to FIG. 13. FIG. 13 is a schematic diagram of hiding an object in a visual layout region according to an exemplary embodiment of this application. The icon indicated by S16 is clicked in (a) in FIG. 13, that is, an object attribute presentation instruction is triggered. If the first object A1 is the fighter plane A, an object attribute interface of the first object A1 (the fighter plane A), that is, the object attribute interface indicated by S6, pops up on the target interface according to the object attribute presentation instruction. The object attribute interface includes attribute information associated with the first object A1. When the user clicks on the icon indicated by S16, a hiding presentation instruction is triggered. The hiding presentation instruction carries an object identifier of the first object A1 (that is, the fighter plane A). As shown in (b) in FIG. 13, the first object A1 (that is, the fighter plane A) and an operable interface corresponding to the first object A1 (that is, the fighter plane A) are then hidden in the visual layout region according to the hiding presentation instruction.

Further, in an exemplary embodiment of this disclosure, a method for hiding an object in the visual layout region is provided. That is, after the presenting an object attribute interface of the first object in the target interface according to the object attribute presentation instruction, the hiding presentation instruction may be further obtained through the object attribute interface. The hiding presentation instruction carries the object identifier of the first object. The first object and the operable interface corresponding to the first object are then hidden in the visual layout region according to the hiding presentation instruction. By using the foregoing manner, the object in the visual layout region may be hidden. On the one hand, information in the interface is more concise during programming. On the other hand, the flexibility of operations can be improved, and setting is facilitated.

Optionally, based on the foregoing exemplary embodiment corresponding to FIG. 3, in an eighth optional embodiment of the object switching method based on visual programming provided in an exemplary embodiment of this application, the method may further include the following steps. In a first step, a function presentation instruction is obtained through the first operable interface. In a second step, a function interface corresponding to the first object is displayed in the visual layout region according to the function presentation instruction. In a third step, a function selection instruction is obtained through the function interface. The function selection instruction carries an operation identifier. In a fourth step, a target operation corresponding to the operation identifier is performed on the first object according to the function selection instruction.

Figure 14:
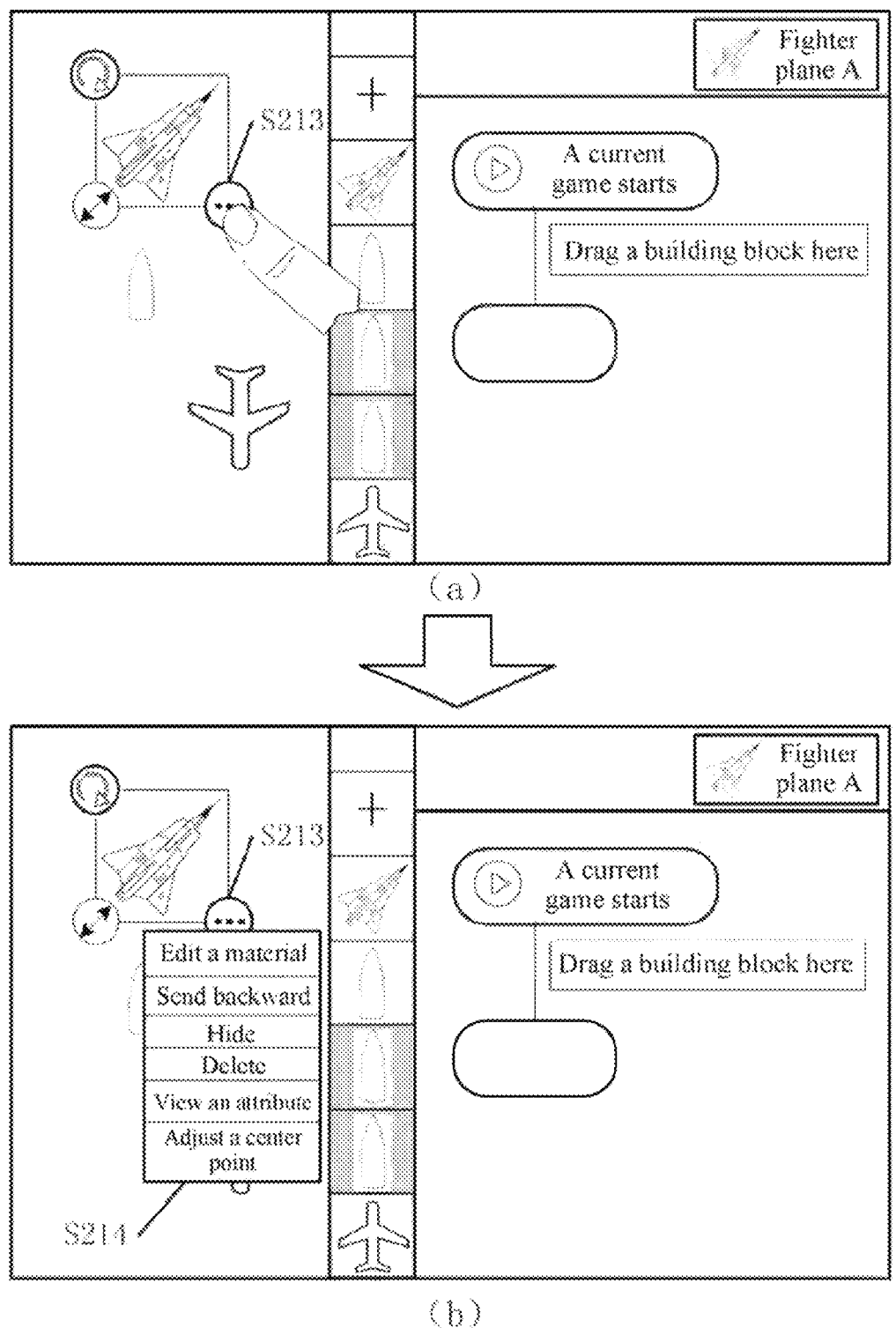
FIG. 14 is a schematic diagram of an exemplary function interface in a visual layout region according to an exemplary embodiment of this disclosure.

In an exemplary embodiment, a method for setting an object is described. For ease of description, FIG. 14 is a schematic diagram of a function interface in a visual layout region according to an exemplary embodiment of this application. As shown in (a) in FIG. 14, if the first object is the fighter plane A, an icon indicated by S213 is selected in the operable interface in which the first object (that is, the fighter plane A) is shown, that is, the function presentation instruction is triggered. After the terminal device responds to the function presentation instruction, an interface shown in (b) in FIG. 14 is entered. In this case, a function interface corresponding to the first object (that is, the fighter plane A) pops up in the visual layout region. The function interface is a region indicated by S214. The user may select any function in the function interface indicated by S214, that is, a function selection instruction is triggered. The function selection instruction carries operation identifiers. For example, an "Edit a material" function corresponds to an operation identifier A, a "Send backward" function corresponds to an operation identifier B, a "Hide" function corresponds to an operation identifier C, a "Delete" function corresponds to an operation identifier D, a "View an attribute" function corresponds to an operation identifier E, and an "Adjust a center point" function corresponds to an operation identifier F. Therefore, a target operation corresponding to the operation identifier is performed on the first object (that is, the fighter plane A) according to the operation identifier carried in the function selection instruction.

Further, in an exemplary embodiment of this disclosure, a method for setting an object through an operable interface is provided. That is, the function presentation instruction is obtained through the operable interface. Then, the function interface corresponding to the first object is displayed in the visual layout region according to the function presentation instruction, and the function selection instruction is then obtained through the function interface. The function selection instruction carries the operation identifier. Finally, the target operation corresponding to the operation identifier is performed on the first object according to the function selection instruction. By using the foregoing manner, the user may more intuitively set an object, thereby improving convenience of operations.

Figure 15:
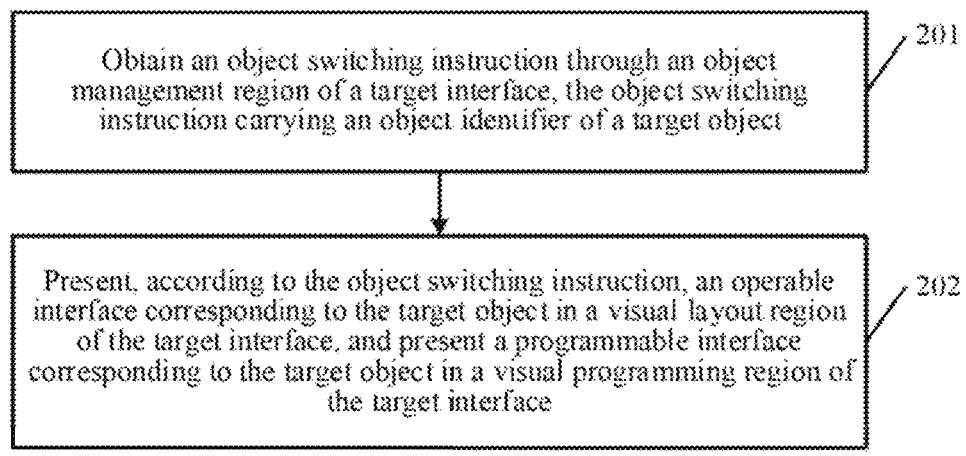
FIG. 15 is a schematic diagram of an exemplary interface presentation method based on visual programming according to an exemplary embodiment of this disclosure.

The interface presentation method based on visual programming in this application is described below with reference to the foregoing description. Referring to FIG. 15, an exemplary embodiment of the interface presentation method based on visual programming in this embodiment of this application includes the following steps.

In step 201, an object switching instruction is obtained through an object management region of a target interface. The object switching instruction carries an object identifier of a target object.

In an exemplary embodiment, based on FIG. 3, the terminal device obtains the object switching instruction through the object management region of the target interface. On the terminal device, the client is deployed, and the visual programming client may be specifically deployed. Referring to FIG. 4 again, FIG. 4 is a schematic diagram of an embodiment of a target interface according to an exemplary embodiment of this disclosure. The user initiates an object switching instruction through an object management region S1 of a target interface, the object switching instruction carrying an object identifier of a target object.

In step 202, according to the object switching instruction, an operable interface corresponding to the target object is presented in a visual layout region of the target interface, and a programmable interface corresponding to the target object is presented in a visual programming region of the target interface.

In an exemplary embodiment, after the user initiates the object switching instruction, the terminal device presents, according to the object switching instruction, the operable interface corresponding to the target object in the visual layout region of the target interface, and presents the programmable interface corresponding to the target object in the visual programming region of the target interface. Referring to FIG. 4 again, the content associated with the target object is presented in both a visual layout region S2 and a visual programming region S3 of the target interface. That is, the visual layout region S2 and the visual programming region S3 have a linkage relationship.

Optionally, each object is first assigned a corresponding object identifier (ID) and any object is then selected in the object management region. The object has a current ID, the object with an ID equal to the current ID in the visual layout region is retrieved according to the current ID, and the object is highlighted and positioned, thereby achieving the linkage effect. For the visual programming region, each building block is provided with an affiliation to a father ID, and any operation of the user on the building block is performed under the scope of a local father ID. In this case, the father ID equal to the current ID needs to be maintained. When the father ID changes, the visual programming region is refreshed to have a new affiliation, thereby achieving the linkage effect. When the user clicks a mode switching button of the object management region, the current ID is first saved, the object management region is then presented by using a new resource manager style, and the object corresponding to the current ID is highlighted.

In an exemplary embodiment of this disclosure, an interface presentation method based on visual programming is provided. First, an object switching instruction is obtained through an object management region of a target interface. The object switching instruction carries an object identifier of a target object. Then, an operable interface corresponding to the target object is presented in a visual layout region of the target interface according to the object switching instruction, and a programmable interface corresponding to the target object is presented in a visual programming region of the target interface. By using the foregoing manner, a linkage switching between the programmable interface and the operable interface can be implemented during visual programming, so that role panels of different roles do not need to frequently pop up. On the one hand, the efficiency of viewing and switching the objects is improved. On the other hand, a calculation amount of the system is reduced, and the system performance is improved.

Optionally, based on the foregoing exemplary embodiment corresponding to FIG. 15, in a first optional embodiment of the interface presentation method based on visual programming provided in an exemplary embodiment of this application, the method may further include the following steps. In a first step, a function presentation instruction is obtained through the operable interface in the visual layout region, and in a second step, a function interface of the target object is displayed in the visual layout region according to the function presentation instruction.

Figure 16:
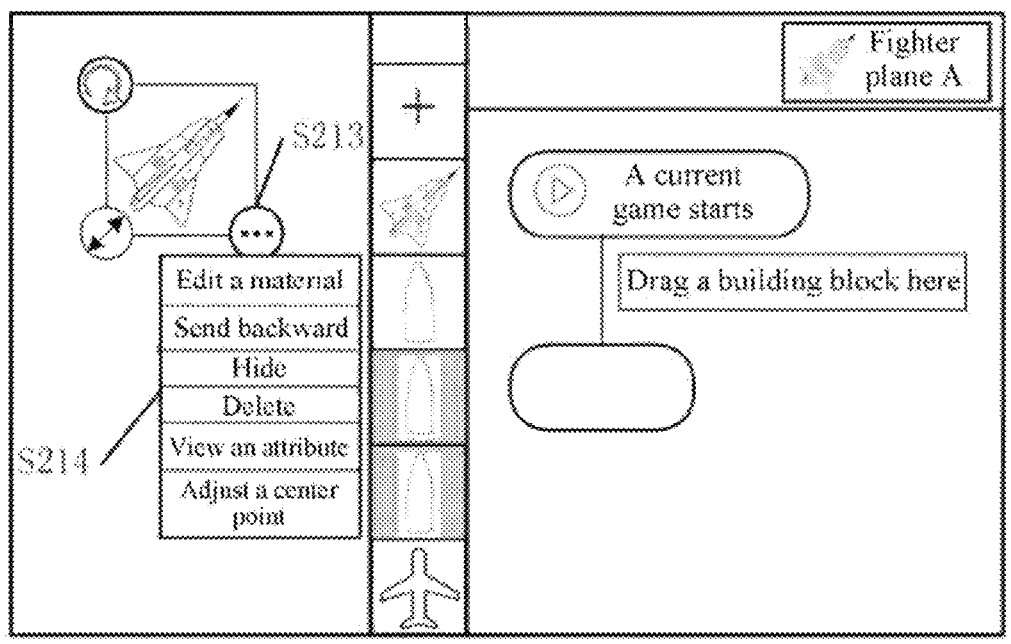
FIG. 16 is a schematic diagram of an exemplary function interface according to an exemplary embodiment of this disclosure.

In an exemplary embodiment, a method for setting an object is described. For ease of description, FIG. 16 is a schematic diagram of a function interface according to an exemplary embodiment of this disclosure. If the target object is the fighter plane A, the icon indicated by S213 is selected in the operable interface in which the target object (that is, the fighter plane A) is shown that is, the function presentation instruction is triggered. After the terminal device responds to the function presentation instruction, in this case, a function interface corresponding to the target object (that is, the fighter plane A) pops up in the visual layout region. The function interface is the region indicated by S214. The user may select any function in the function interface indicated by S214, that is, a function selection instruction is triggered. The function selection instruction carries operation identifiers. For example, an "Edit a material" function corresponds to an operation identifier A, a "Send backward" function corresponds to an operation identifier B, a "Hide" function corresponds to an operation identifier C, a "Delete" function corresponds to an operation identifier D, a "View an attribute" function corresponds to an operation identifier E, and an "Adjust a center point" function corresponds to an operation identifier F. Therefore, a target operation corresponding to the operation identifier is performed on the target object (that is, the fighter plane A) according to the operation identifier carried in the function selection instruction.

Further, in an exemplary embodiment of this disclosure, a method for setting an object through an operable interface is provided. First, the function presentation instruction is obtained through the operable interface in the visual layout region. Then, the function interface of the target object is displayed in the visual layout region according to the function presentation instruction. By using the foregoing manner, the user may more intuitively set an object, thereby improving convenience of operations.

Optionally, based on the foregoing exemplary embodiment corresponding to FIG. 15, in a second optional embodiment of the interface presentation method based on visual programming provided in an exemplary embodiment of this disclosure, the method may further include the following steps. In a first step, N to-be-programmed objects are displayed through the object management region. N is an integer greater than or equal to 1. In a second step, a region sliding instruction is obtained through the object management region of the target interface. In a third step, M to-be-programmed objects are displayed in the object management region according to the region sliding instruction. The M to-be-programmed objects and the N to-be-programmed objects have K identical to-be-programmed objects, M is an integer greater than or equal to 1, and K is an integer greater than or equal to 0 and less than N.

In an exemplary embodiment, a method for operating the object management region is described. For ease of description, referring to FIG. 9 again, N to-be-programmed objects, for example, five to-be-programmed objects, that is, two fighter planes and three bullets, are presented in the object management region indicated by S1 in (a) in FIG. 9. The user may perform upward sliding in the object management region, that is, trigger the region sliding instruction, to enter the object management region indicated by S1 in (b) in FIG. 9. M to-be-programmed objects, for example, five to-be-programmed objects, that is, one fighter plane and four bullets, are presented in the object management region at this point. The M to-be-programmed objects and N to-be-programmed objects have K identical to-be-programmed objects, and K is 4.

It may be understood that, the user may further perform downward sliding in the object management region, that is, trigger the region sliding instruction. In this case, the to-be-programmed objects in the object management region also change.

Further, in an exemplary embodiment of this disclosure, a method for viewing an object by sliding in an object management region is provided. That is, a region sliding instruction is first obtained through the object management region, the object management region being used for presenting N to-be-programmed objects, and M to-be-programmed objects are then displayed in the object management region according to the region sliding instruction, the M to-be-programmed objects and the N to-be-programmed objects having K identical to-be-programmed objects. By using the foregoing manner, the user may view different objects in the object management region in a sliding and dragging manner. That is, content in the object management region may change according to requirements of the user, thereby improving the flexibility and operability of operations.

Figure 17:
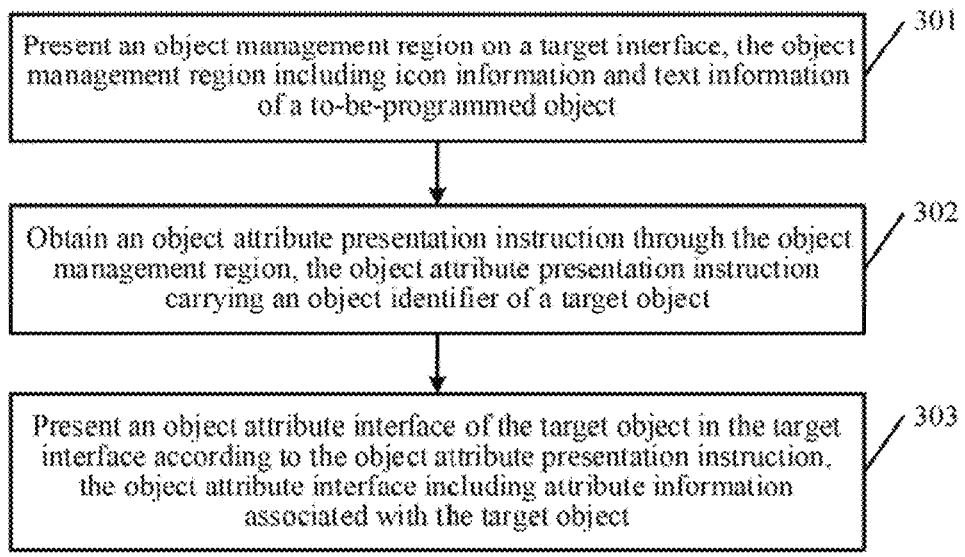
FIG. 17 is a schematic diagram of another exemplary interface presentation method based on visual programming according to an exemplary embodiment of this disclosure.

The interface presentation method based on visual programming in this application is described below with reference to the foregoing description. Referring to FIG. 17, an interface presentation method based on visual programming in an exemplary embodiment of this disclosure includes the following steps.

In step 301, an object management region is presented on a target interface. The object management region includes icon information and text information of a to-be-programmed object.

In an exemplary embodiment, the terminal device presents an object management region on the target interface. The object management region includes the icon information and the text information of the to-be-programmed object. Specifically, referring to FIG. 11 again, the icon information and the text information of the to-be-programmed object are presented in the object management region indicated by S1.

In step 302, an object attribute presentation instruction is obtained through the object management region. The object attribute presentation instruction carries an object identifier of a target object. In an exemplary embodiment, the terminal device obtains, through the object management region, the object attribute presentation instruction triggered by the user. The object attribute presentation instruction carries the object identifier of the target object.

In step 303, an object attribute interface of the target object is presented in the target interface according to the object attribute presentation instruction. The object attribute interface including attribute information associated with the target object.

In an exemplary embodiment, the terminal device presents the object attribute interface of the target object in the target interface according to the object attribute presentation instruction. If the target object is the fighter plane A, the object attribute interface of the target object pops up on the target interface according to the object attribute presentation instruction. The object attribute interface includes the attribute information associated with the target object, which may include a coordinate position, a width, a height, whether a proportion is maintained, a rotation angle, and whether a horizontal mirror is selected for the target object (for example, the fighter plane A). In addition, operations such as deletion, copying, hiding, or restoring all parameters may be further performed on the target object (for example, the fighter plane A).

In an exemplary embodiment of this disclosure, an interface presentation method based on visual programming is provided. An object management region is first presented on the target interface, the object management region including icon information and text information of a to-be-programmed object. An object attribute presentation instruction is obtained through the object management region. An object attribute interface of the target object is finally presented in the target interface according to the object attribute presentation instruction. By using the foregoing manner, the user may choose to enter the target interface in the full mode. In the full mode, the user may view more object information, to assist in recording the related information of the object, and to assist in performing additional operations in the object management region.

Figure 18:
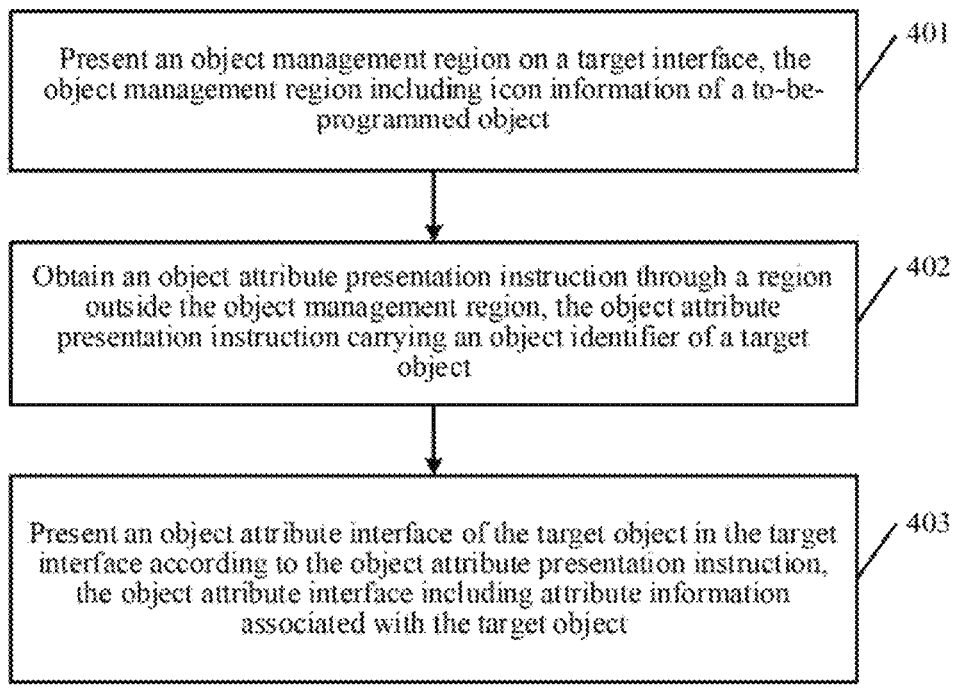
FIG. 18 is a schematic diagram of another exemplary interface presentation method based on visual programming according to an exemplary embodiment of this disclosure.

The interface presentation method based on visual programming in this application is described below with reference to the foregoing description. Referring to FIG. 18, an interface presentation method based on visual programming in an exemplary embodiment of this disclosure includes the following steps.

In step 401, an object management region is presented on a target interface. The object management region includes icon information of a to-be-programmed object.

In an exemplary embodiment, the terminal device presents an object management region on the target interface, the object management region including the icon information of the to-be-programmed object. Specifically, referring to FIG. 12 again, the icon information of the to-be-programmed object is presented in the object management region indicated by S1.

In step 402, an object attribute presentation instruction is obtained through a region outside the object management region. The object attribute presentation instruction carries an object identifier of a target object.

In an exemplary embodiment, the terminal device obtains, through the region outside the object management region, the object attribute presentation instruction triggered by the user. The object attribute presentation instruction carries the object identifier of the target object.

In step 403, an object attribute interface of the target object is presented in the target interface according to the object attribute presentation instruction. The object attribute interface including attribute information associated with the target object.

In an exemplary embodiment, the terminal device presents the object attribute interface of the target object in the target interface according to the object attribute presentation instruction. If the target object is the fighter plane A, the object attribute interface of the target object pops up on the target interface according to the object attribute presentation instruction. The object attribute interface includes the attribute information associated with the target object, which specifically includes a coordinate position, a width, a height, whether a proportion is maintained, a rotation angle, and whether a horizontal mirror is selected for the target object (for example, the fighter plane A). In addition, operations such as deletion, copying, hiding, or restoring all parameters may be further performed on the target object (for example, the fighter plane A).

In an exemplary embodiment of this disclosure, an interface presentation method based on visual programming is provided. An object management region is first presented on a target interface. An object attribute presentation instruction is then obtained through a region outside the object management region. The object attribute presentation instruction carries an object identifier of the target object. An object attribute interface of the target object is finally presented in the target interface according to the object attribute presentation instruction. By using the foregoing manner, the user may freely choose to switch between the two modes, thereby saving more visual space for the programmable interface.

Figure 19:
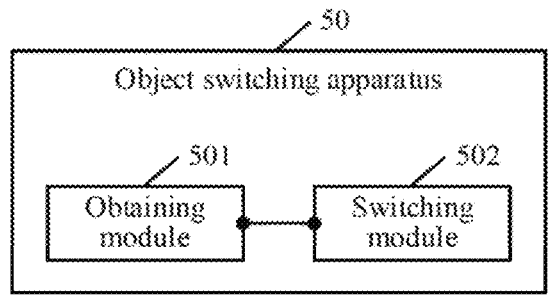
FIG. 19 is a schematic diagram of an exemplary object switching apparatus according to an exemplary embodiment of this disclosure.

An object switching apparatus according to an exemplary embodiment of this disclosure is described below in detail with reference to FIG. 19. FIG. 19 is a schematic diagram of an object switching apparatus according to an exemplary embodiment of this disclosure. The object switching apparatus 50 includes an obtaining module 501 configured to obtain an object switching instruction through an object management region of a target interface. The object switching instruction carries an object identifier of a first object. A switching module 502 is configured to switch, according to the object switching instruction obtained by the obtaining module, a second operable interface corresponding to a second object to a first operable interface corresponding to the first object in a visual layout region of the target interface, and switch a programmable interface corresponding to the second object to a programmable interface corresponding to the first object in a visual programming region of the target interface. The first object and the second object are included in the object management region, and the first object and the second object have different object identifiers. As can be appreciated, the obtaining module 501 and the switching module 502 may include circuitry to perform the functions described herein.

In an exemplary embodiment, the obtaining module 501 obtains the object switching instruction through the object management region of the target interface. The object switching instruction carries the object identifier of the first object. The switching module 502 switches, according to the object switching instruction obtained by the obtaining module, the second operable interface corresponding to the second object to the first operable interface corresponding to the first object in the visual layout region of the target interface, and switches the programmable interface corresponding to the second object to the programmable interface corresponding to the first object in the visual programming region of the target interface. The first object and the second object are included in the object management region, and the first object and the second object have different object identifiers.

In an exemplary embodiment of this disclosure, an object switching apparatus based on visual programming is provided. First, an object switching instruction is obtained through an object management region of a target interface. The object switching instruction carries an object identifier of a first object. Then, a second operable interface corresponding to a second object is switched to a first operable interface corresponding to the first object in a visual layout region of the target interface according to the object switching instruction, and a programmable interface corresponding to the second object is switched to a programmable interface corresponding to the first object in a visual programming region of the target interface. The second object and the first object have different object identifiers, and the programmable interface corresponds to the first object and the first operable interface corresponding to the first object is corresponding to the object identifier of the first object. By using the foregoing manner, during visual programming, when being switching an object, a user directly switches to a programmable interface and an operable interface that correspond to the object on a target interface, and a linkage between both of the two interfaces for switching states is achieved, so that role panels of different roles do not need to frequently pop up. On the one hand, the efficiency of viewing and switching the objects is improved. On the other hand, a calculation amount of the system is reduced, and the system performance is improved.

Figure 20:
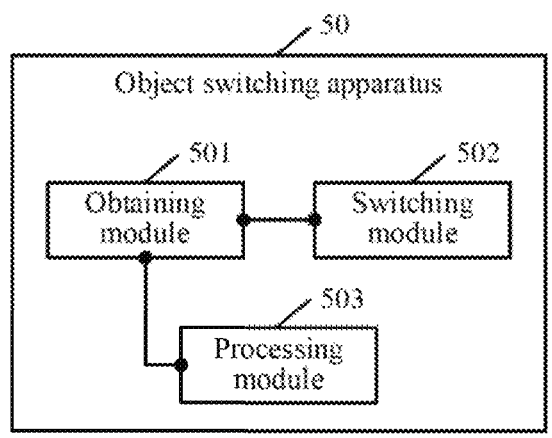
FIG. 20 is a schematic diagram of another exemplary object switching apparatus according to an exemplary embodiment of this disclosure.

Optionally, based on the foregoing exemplary embodiment corresponding to FIG. 19, referring to FIG. 20, in another exemplary embodiment of the object switching apparatus 50, the object switching apparatus further includes a processing module 503. The obtaining module 501 is further configured to obtain a region hiding instruction, and the processing module 503 is configured to hide an object management region on a target interface according to the region hiding instruction obtained by the obtaining module 501. As can be appreciated the processing module may be implemented by circuitry that performs the functions described herein.

Further, in an exemplary embodiment of this disclosure, an apparatus for hiding an object management region is provided. That is, the user may further initiate a region hiding instruction through the target interface. After obtaining the region hiding instruction, the object switching apparatus hides the object management region on the target interface according to the region hiding instruction. By using the foregoing manner, the object management region is hidden when the object management region is not required for use. Therefore, a position occupied by the object management region is vacated, so that the visual layout region and/or the visual programming region is enlarged, thereby improving the convenience of operations, and also optimizing the target interface.

Optionally, based on the foregoing exemplary embodiment corresponding to FIG. 20, in another exemplary embodiment of the object switching apparatus 50, before the obtaining an object switching instruction through an object management region of a target interface, the obtaining module 501 is further configured to obtain a region display instruction. The processing module 503 is configured to present, according to the region display instruction obtained by the obtaining module 501, the object management region on the target interface in a form of a sub-interface that is displayed independent of the target interface, or present the object management region in a preset region of the target interface in an embedded form according to the region display instruction.

Further, in an exemplary embodiment of this disclosure, two manners of presenting the object management region are provided. Before the obtaining an object switching instruction through an object management region of a target interface, a region display instruction may be further obtained, the object management region is then presented, according to the region display instruction, on the target interface in a form of a sub-interface that is displayed independent of the target interface. The object management region may also be presented in a preset region of the target interface in an embedded form according to the region display instruction. By using the foregoing manner, the object management region may be presented in different forms. The visual layout region and the visual programming region may not be occupied by presenting the object management region in the form of a sub-interface that is displayed independent of the target interface, and the object management region may be more stably presented by presenting the object management region in the embedded form, thereby improving the flexibility and feasibility of the solution.

Optionally, based on the foregoing exemplary embodiment corresponding to FIG. 20, in another exemplary embodiment of the object switching apparatus 50, the processing module 503 is configured to display N to-be-programmed objects through the object management region, where N is an integer greater than or equal to 1. The obtaining module 501 is further configured to obtain a region sliding instruction through the object management region. The processing module 503 is further configured to display M to-be-programmed objects in the object management region according to the region sliding instruction obtained by the obtaining module 501. The M to-be-programmed objects and the N to-be-programmed objects have K identical to-be-programmed objects, M is an integer greater than or equal to 1, and K is an integer greater than or equal to 0 and less than N.

Further, in an exemplary embodiment of this disclosure, an apparatus for viewing an object by sliding in an object management region is provided. That is, a region sliding instruction is first obtained through the object management region. The object management region is used for presenting N to-be-programmed objects, and M to-be-programmed objects are then displayed in the object management region according to the region sliding instruction. The M to-be-programmed objects and the N to-be-programmed objects have K identical to-be-programmed objects. By using the foregoing manner, the user may view different objects in the object management region in a sliding and dragging manner. That is, content in the object management region may change according to requirements of the user, thereby improving the flexibility and operability of operations.

Optionally, based on the foregoing exemplary embodiment corresponding to FIG. 20, in another exemplary embodiment of the object switching apparatus 50, the processing module 503 is configured to present, in a case that a first mode switching instruction is obtained, an object management region corresponding to a first mode on the target interface according to the first mode switching instruction.

The processing module 503 is further configured to present, in a case that a second mode switching instruction is obtained, an object management region corresponding to a second mode on the target interface according to the second mode switching instruction, where the first mode and the second mode are two different interface presentation modes.

Further, in an exemplary embodiment of this disclosure, an apparatus for switching modes is provided. An object management region corresponding to a first mode is presented on the target interface according to a first mode switching instruction in a case that the first mode switching instruction is obtained, and an object management region corresponding to a second mode is presented on the target interface according to a second mode switching instruction in a case that the second mode switching instruction is obtained. The first mode and the second mode are two different interface presentation modes. By using the foregoing manner, the user may select, according to operating habits and actual requirements, a corresponding mode to operate. One is the full mode, and the other is the brief mode. A better implementation may be provided for the solution through a flexible switching between the two modes.

Optionally, based on the foregoing exemplary embodiment corresponding to FIG. 20, in another exemplary embodiment of the object switching apparatus 50, the processing module 503 is configured to present a first object management region on the target interface, where the first object management region includes icon information and text information of a to-be-programmed object.

Optionally, based on the foregoing exemplary embodiment corresponding to FIG. 20, in another exemplary embodiment of the object switching apparatus 50, the processing module 503 is configured to present a second object management region on the target interface, where the second object management region includes icon information of a to-be-programmed object.

Optionally, based on the foregoing exemplary embodiment corresponding to FIG. 20, in another exemplary embodiment of the object switching apparatus 50, the processing module 503 is configured to obtain an object attribute presentation instruction, where the object attribute presentation instruction carries the object identifier of the first object. The processing module 503 is also configured to present an object attribute interface of the first object in the target interface according to the object attribute presentation instruction, where the object attribute interface includes attribute information associated with the first object.

Optionally, based on the foregoing exemplary embodiment corresponding to FIG. 20, in another exemplary embodiment of the object switching apparatus 50, after the presenting an object attribute interface of the first object in the target interface according to the object attribute presentation instruction, the obtaining module 501 is further configured to obtain a hiding presentation instruction through the object attribute interface. The hiding presentation instruction carries the object identifier of the first object.

The processing module 503 is further configured to hide the first object and the first operable interface corresponding to the first object in the visual layout region according to the hiding presentation instruction obtained by the obtaining module 501.

Further, in an exemplary embodiment of this disclosure, an apparatus for hiding an object in the visual layout region is provided. That is, after the presenting an object attribute interface of the first object in the target interface according to the object attribute presentation instruction, the hiding presentation instruction may be further obtained through the object attribute interface. The hiding presentation instruction carries the object identifier of the first object. The first object and the operable interface corresponding to the first object are then hidden in the visual layout region according to the hiding presentation instruction. By using the foregoing manner, the object in the visual layout region may be hidden. On the one hand, information in the interface is more concise during programming. On the other hand, the flexibility of operations can be improved, and setting is facilitated.

Optionally, based on the foregoing exemplary embodiment corresponding to FIG. 20, in an exemplary embodiment of the object switching apparatus 50, the obtaining module 501 is further configured to obtain a function presentation instruction through the first operable interface.

The processing module 503 is further configured to display a function interface corresponding to the first object in the visual layout region according to the function presentation instruction obtained by the obtaining module 501.

The obtaining module 501 is further configured to obtain a function selection instruction through the function interface, where the function selection instruction carries an operation identifier.

The processing module 503 is further configured to perform a target operation corresponding to the operation identifier on the first object according to the function selection instruction obtained by the obtaining module 501.

Further, in an exemplary embodiment of this disclosure, an apparatus for setting an object through an operable interface is provided. That is, the function presentation instruction is obtained through the operable interface. Then, the function interface corresponding to the first object is displayed in the visual layout region according to the function presentation instruction, and the function selection instruction is then obtained through the function interface. The function selection instruction carries the operation identifier. Finally, the target operation corresponding to the operation identifier is performed on the first object according to the function selection instruction. By using the foregoing manner, the user may more intuitively set an object, thereby improving convenience of operations.

Figure 21:
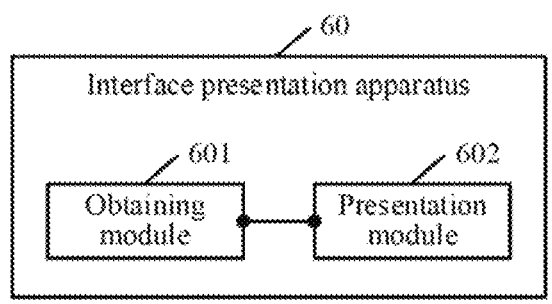
FIG. 21 is a schematic diagram of an exemplary interface presentation apparatus according to an exemplary embodiment of this disclosure.

The interface presentation apparatus is described below in detail with reference to FIG. 21. FIG. 21 is a schematic diagram of an interface presentation apparatus according to an exemplary embodiment of this disclosure. The interface presentation apparatus 60 includes an obtaining module 601 configured to obtain an object switching instruction through an object management region of a target interface. The object switching instruction carries an object identifier of a target object. A presentation module 602 is configured to present, according to the object switching instruction obtained by the obtaining module 601, an operable interface corresponding to the target object in a visual layout region of the target interface, and present a programmable interface corresponding to the target object in a visual programming region of the target interface.

In an exemplary embodiment, the obtaining module 601 obtains the object switching instruction through the object management region of the target interface, where the object switching instruction carries the object identifier of the target object. The presentation module 602 presents the operable interface corresponding to the target object in the visual layout region of the target interface according to the object switching instruction obtained by the obtaining module 601, and presents the programmable interface corresponding to the target object in the visual programming region of the target interface.

In an exemplary embodiment of this disclosure, an interface presentation apparatus based on visual programming is provided. First, an object switching instruction is obtained through an object management region of a target interface, where the object switching instruction carries an object identifier of a target object. Then, an operable interface corresponding to the target object is presented in a visual layout region of the target interface according to the object switching instruction, and a programmable interface corresponding to the target object is presented in a visual programming region of the target interface. By using the foregoing manner, a linkage switching between the programmable interface and the operable interface can be implemented during visual programming, so that role panels of different roles do not need to frequently pop up. On the one hand, the efficiency of viewing and switching the objects is improved. On the other hand, a calculation amount of the system is reduced, and the system performance is improved.

Optionally, based on the foregoing exemplary embodiment corresponding to FIG. 21, in another exemplary embodiment of the interface presentation apparatus 50, the obtaining module 601 is further configured to obtain a function presentation instruction through the operable interface in the visual layout region.

The presentation module 602 is further configured to display a function interface of the target object in the visual layout region according to the function presentation instruction obtained by the obtaining module 601.

Further, in an exemplary embodiment of this disclosure, an apparatus for setting an object through an operable interface is provided. First, the function presentation instruction is obtained through the operable interface in the visual layout region. Then, the function interface of the target object is displayed in the visual layout region according to the function presentation instruction. By using the foregoing manner, the user may more intuitively set an object, thereby improving convenience of operations.

Optionally, based on the foregoing exemplary embodiment corresponding to FIG. 21, in another exemplary embodiment of the interface presentation apparatus 50, the presentation module 602 is further configured to display N to-be-programmed objects through the object management region, N being an integer greater than or equal to 1.

The obtaining module 601 is further configured to obtain a region sliding instruction through the object management region.

The presentation module 602 is further configured to display M to-be-programmed objects in the object management region according to the region sliding instruction obtained by the obtaining module 601, where the M to-be-programmed objects and the N to-be-programmed objects have K identical to-be-programmed objects, M is an integer greater than or equal to 1, and K is an integer greater than or equal to 0 and less than N.

Further, in an exemplary embodiment of this disclosure, an apparatus for viewing an object by sliding in an object management region is provided. That is, a region sliding instruction is first obtained through the object management region, the object management region being used for presenting N to-be-programmed objects, and M to-be-programmed objects are then displayed in the object management region according to the region sliding instruction, the M to-be-programmed objects and the N to-be-programmed objects having K identical to-be-programmed objects. By using the foregoing manner, the user may view different objects in the object management region in a sliding and dragging manner. That is, content in the object management region may change according to requirements of the user, thereby improving the flexibility and operability of operations.

Figure 22:
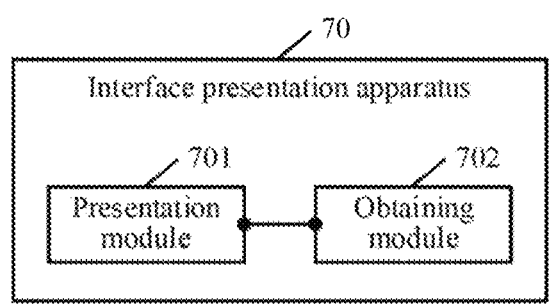
FIG. 22 is a schematic diagram of an exemplary interface presentation apparatus according to an exemplary embodiment of this disclosure.

The interface presentation apparatus is described below in detail. Referring to FIG. 22, FIG. 22 is a schematic diagram of an interface presentation apparatus according to an exemplary embodiment of this application. The interface presentation apparatus 70 includes a presentation module 701 configured to present an object management region on a target interface. The object management region includes icon information and text information of a to-be-programmed object. An obtaining module 702 is configured to obtain an object attribute presentation instruction through the object management region presented by the presentation module 701, where the object attribute presentation instruction carries an object identifier of a target object. The presentation module 701 is further configured to present an object attribute interface of the target object in the target interface according to the object attribute presentation instruction obtained by the obtaining module 702. The object attribute interface includes attribute information associated with the target object.

In an exemplary embodiment, the presentation module 701 presents the object management region on the target interface. The object management region includes the icon information and the text information of the to-be-programmed object. The obtaining module 702 obtains the object attribute presentation instruction through the object management region presented by the presentation module 701, where the object attribute presentation instruction carries the object identifier of the target object. The presentation module 701 presents the object attribute interface of the target object in the target interface according to the object attribute presentation instruction obtained by the obtaining module 702, where the object attribute interface includes the attribute information associated with the target object.

In an exemplary embodiment of this disclosure, an interface presentation apparatus based on visual programming is provided. An object management region is first presented on the target interface, where the object management region includes icon information and text information of a to-be-programmed object. An object attribute presentation instruction is obtained through the object management region. An object attribute interface of the target object is finally presented in the target interface according to the object attribute presentation instruction. By using the foregoing manner, the user may choose to enter the target interface in the full mode. In the full mode, the user may view more object information, to assist in recording the related information of the object, and to assist in performing additional operations in the object management region.

Figure 23:
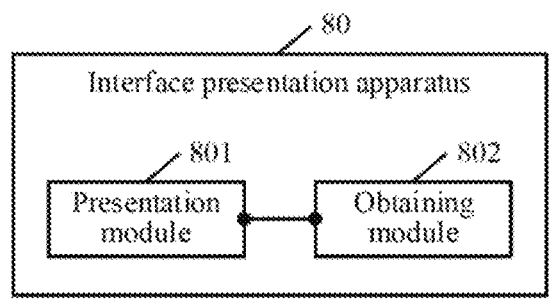
FIG. 23 is a schematic diagram of an exemplary interface presentation apparatus according to an exemplary embodiment of this disclosure.

The interface presentation apparatus is described below in detail. Referring to FIG. 23, FIG. 23 is a schematic diagram of an interface presentation apparatus according to an exemplary embodiment of this application. The interface presentation apparatus 80 includes a presentation module 801 configured to present an object management region on a target interface, where the object management region includes icon information of a to-be-programmed object. An obtaining module 802 is configured to obtain an object attribute presentation instruction through a region outside the object management region presented by the presentation module 801, where the object attribute presentation instruction carries an object identifier of a target object. The presentation module 801 is further configured to present an object attribute interface of the target object in the target interface according to the object attribute presentation instruction obtained by the obtaining module 802. The object attribute interface includes attribute information associated with the target object.

In an exemplary embodiment, the presentation module 801 presents the object management region on the target interface, where the object management region includes the icon information of the to-be-programmed object. The obtaining module 802 obtains the object attribute presentation instruction through the region outside the object management region presented by the presentation module 801. The object attribute presentation instruction carries the object identifier of the target object. The presentation module 801 presents the object attribute interface of the target object in the target interface according to the object attribute presentation instruction obtained by the obtaining module 802. The object attribute interface includes the attribute information associated with the target object.

In an exemplary embodiment of this disclosure, an interface presentation apparatus based on visual programming is provided. An object management region is first presented on a target interface. An object attribute presentation instruction is then obtained through a region outside the object management region, where the object attribute presentation instruction carries an object identifier of the target object. An object attribute interface of the target object is finally presented in the target interface according to the object attribute presentation instruction. By using the foregoing manner, the user may freely choose to switch between the two modes, thereby saving more visual space for the programmable interface.

Figure 24:
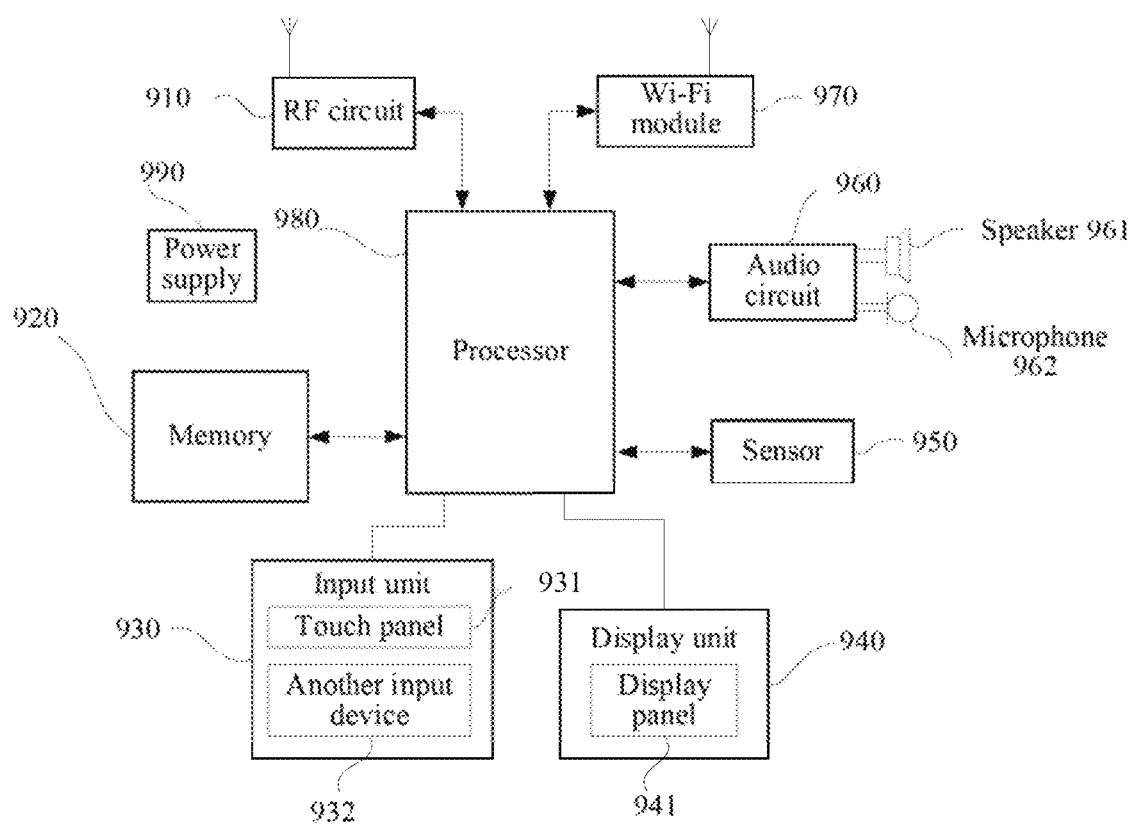
FIG. 24 is a schematic structural diagram of a terminal device according to an exemplary embodiment of this disclosure.

The exemplary embodiments of this disclosure further provide another object switching apparatus and interface presentation apparatus. As shown in FIG. 24, for ease of description, only parts related to the embodiments of this application are shown. For specific technical details that are not disclosed, refer to the method part of the exemplary embodiments of this disclosure. The terminal device may be any terminal device including a mobile phone, a notebook computer, a desktop computer, a tablet computer, a personal digital assistant (PDA), a point of sales (POS), an on-board computer, a modem, a machine type communication (MTC) device, and a sensor, and an example in which the terminal device is the tablet computer is used.

FIG. 24 is a block diagram of a part of a structure of a tablet computer related to a terminal device according to an exemplary embodiment of this application. Referring to FIG. 24, the tablet computer includes components such as a radio frequency (RF) circuit 910, a memory 920, an input unit 930, a display unit 940, a sensor 950, an audio circuit 960, Wi-Fi module 970, a processor 980, and a power supply 990. A person skilled in the art will recognize that the structure of the tablet computer shown in FIG. 24 does not constitute a limitation on the tablet computer, and the tablet computer may include more or fewer components than those shown in the figure, or some components may be combined, or a different component deployment may be used.

The following describes the components of the tablet computer with reference to FIG. 24.

The RF circuit 910 may be configured to receive and transmit signals during an information receiving and transmission process or a call process. Specifically, the RF circuit receives downlink information from a base station, then delivers the downlink information to the processor 980 for processing, and transmits designed uplink data to the base station. Usually, the RF circuit 910 includes, but not limited to, an antenna, at least one amplifier, a transceiver, a coupler, a low noise amplifier (LNA), and a duplexer. In addition, the RF circuit 910 may alternatively communicate with a network and another device through wireless communication. The wireless communication may use any communication standard or protocol, including but not limited to Global System for Mobile Communications (GSM), general packet radio service (GPRS), Code Division Multiple Access (CDMA), Wideband Code Division Multiple Access (WCDMA), Long Term Evolution (LTE), email, Short Messaging Service (SMS), and the like.

The memory 920 may include circuitry configured to store a software program and module. The processor 980 includes processing circuitry that runs the software program and module stored in the memory 920, to implement various functional applications and data processing of the tablet computer. The memory 920 may mainly include a program storage area and a data storage area. The program storage area may store an operating system, an application program required by at least one function (for example, a sound playback function and an image playback function), or the like. The data storage area may store data (for example, audio data and a telephone book) and the like created according to use of the tablet computer. In addition, the memory 920 may include a high speed random access memory, and may alternatively include a non-volatile memory, such as at least one magnetic disk storage device, a flash memory, or another volatile solid-state storage device.

The input unit 930 may include circuitry configured to receive input digit or character information, and generate a keyboard signal input related to the user setting and function control of the tablet computer. Optionally, the input unit 930 may include a touch panel 931 and another input device 932. The touch panel 931, which may alternatively be referred to as a touchscreen, may collect a touch operation of a user on or near the touch panel (such as an operation of a user on or near the touch panel 931 by using any suitable object or accessory such as a finger or a stylus), and drive a corresponding connection apparatus according to a preset program. Optionally, the touch panel 931 may include two parts, such as a touch detection apparatus and a touch controller. The touch detection apparatus detects a touch orientation of the user, detects a signal brought by the touch operation, and transmits the signal to the touch controller. The touch controller receives touch information from the touch detection apparatus, converts the touch information into a contact coordinate, then transmits the contact coordinate to the processor 980, and receives and executes a command transmitted by the processor 980. In addition, the touch panel 931 may be implemented by using various types, such as a resistive type, a capacitive type, an infrared type, and a surface acoustic wave type. In addition to the touch panel 931, the input unit 930 may further include the other input device 932. Optionally, the another input device 932 may include, but not limited to, one or more of a physical keyboard, a functional key (such as a volume control key or a switch key), a track ball, a mouse, and a joystick.

The display unit 940 may include circuitry configured to display information inputted by the user or information provided for the user, and various menus of the tablet computer. The display unit 940 may include a display panel 941. Optionally, the display panel 941 may be configured by using a liquid crystal display (LCD), an organic light-emitting diode (OLED), or the like. Further, the touch panel 931 may cover the display panel 941. After detecting a touch operation on or near the touch panel, the touch panel 931 transfers the touch operation to the processor 980, to determine a type of a touch event. Then, the processor 980 provides a corresponding visual output on the display panel 941 according to the type of the touch event. Although in FIG. 24, the touch panel 931 and the display panel 941 are used as two separate parts to implement input and output functions of the tablet computer, in some embodiments, the touch panel 931 and the display panel 941 may be integrated to implement the input and output functions of the tablet computer.

The tablet computer may further include at least one sensor 950 such as an optical sensor, a motion sensor, and other sensors. Optionally, the optical sensor may include an ambient light sensor and a proximity sensor, where the ambient light sensor may adjust luminance of the display panel 941 according to the luminance of the ambient light, and the proximity sensor may switch off the display panel 941 and/or backlight when the tablet computer is moved to the ear. As one type of motion sensor, an acceleration sensor can detect magnitude of accelerations in various directions (generally on three axes), may detect magnitude and a direction of the gravity when static, and may be applied to an application that recognizes the attitude of the tablet computer (for example, switching between landscape orientation and portrait orientation, a related game, and magnetometer attitude calibration), a function related to vibration recognition (such as a pedometer and a knock), and the like. Other sensors, such as a gyroscope, a barometer, a hygrometer, a thermometer, and an infrared sensor, which may be configured in the tablet computer, are not further described herein.

In the audio circuit 960, a speaker 961, and a microphone 962 may provide audio interfaces between the user and the tablet computer. The audio circuit 960 may convert received audio data into an electrical signal and transmit the electrical signal to the speaker 961. The speaker 961 converts the electrical signal into a sound signal and outputs the sound signal. According to another aspect, the microphone 962 converts a collected sound signal into an electrical signal. After receiving the electrical signal, the audio circuit 960 converts the electrical signal into audio data and then outputs the audio data. After being processed by the processor 980, the audio data is transmitted through the RF circuit 910 to, for example, another tablet computer or the audio data is outputted to the memory 920 for further processing.

Wi-Fi is a short distance wireless transmission technology. The tablet computer may help, by using the Wi-Fi module 970 and the circuitry implemented therein, a user receive and transmit an email, browse a web page, access stream media, and the like. This provides wireless broadband Internet access for the user. Although FIG. 24 shows the Wi-Fi module 970, it may be understood that the Wi-Fi module is not a necessary component of the tablet computer, and the Wi-Fi module may be omitted as required provided that the scope of the essence of the present disclosure is not changed.

The processor 980 is a control center of the tablet computer, and is connected to various parts of the entire tablet computer by using various interfaces and lines. By running or executing a software program and/or module stored in the memory 920, and invoking data stored in the memory 920, the processor executes various functions of the tablet computer and performs data processing, thereby monitoring the entire tablet computer. Optionally, the processor 980 may include one or more processing units. Optionally, the processor 980 may integrate an application processor and a modem processor, where the application processor mainly processes an operating system, a user interface, an application program, and the like, and the modem processor mainly processes wireless communication. It may be understood that the foregoing modem may either not be integrated into the processor 980.

The tablet computer further includes the power supply 990 (such as a battery) for supplying power to the components. Optionally, the power supply may be logically connected to the processor 980 by using a power management system, thereby implementing functions such as charging, discharging and power consumption management by using the power management system.

Although not shown in the figure, the tablet computer may further include a camera, a Bluetooth module, and the like. Details are not described herein again.

In an exemplary embodiment of this disclosure, the processor 980 included in the terminal device further has the following functions. In a first function, an object switching instruction is obtained through an object management region of a target interface. The object switching instruction carries an object identifier of a first object. In a second function, according to the object switching instruction, a second operable interface corresponding to a second object is switched to a first operable interface corresponding to the first object in a visual layout region of the target interface. In a third function, a programmable interface corresponding to the second object is switched to a programmable interface corresponding to the first object in a visual programming region of the target interface. The first object and the second object are included in the object management region, and the first object and the second object have different object identifiers.

Optionally, the processor 980 is further configured to obtain a region hiding instruction, and hide the object management region on the target interface according to the region hiding instruction.

Optionally, the processor 980 is further configured to obtain a region display instruction, and, according to the region display instruction, present the object management region on the target interface in a form of a sub-interface that is displayed independent of the target interface, or present the object management region in a preset region of the target interface in an embedded form according to the region display instruction.

Optionally, the processor 980 is further configured to display N to-be-programmed objects through the object management region, where N is an integer greater than or equal to 1. The processor may also be configured to obtain a region sliding instruction through the object management region, and display M to-be-programmed objects in the object management region according to the region sliding instruction, where the M to-be-programmed objects and the N to-be-programmed objects have K identical to-be-programmed objects. M is an integer greater than or equal to 1, and K is an integer greater than or equal to 0 and less than N.

Optionally, the processor 980 is further configured to present, in a case that a first mode switching instruction is obtained, an object management region corresponding to a first mode on the target interface according to the first mode switching instruction, and present, in a case that a second mode switching instruction is obtained, an object management region corresponding to a second mode on the target interface according to the second mode switching instruction. The first mode and the second mode are two different interface presentation modes.

Optionally, the processor 980 is further configured to present a first object management region on the target interface, where the first object management region includes icon information and text information of a to-be-programmed object.

Optionally, the processor 980 is further configured to present a second object management region on the target interface, where the second object management region includes icon information of a to-be-programmed object.

Optionally, the processor 980 is further configured to obtain an object attribute presentation instruction, where the object attribute presentation instruction carries the object identifier of the first object. The processor 980 is also configured to present an object attribute interface of the first object in the target interface according to the object attribute presentation instruction, where the object attribute interface includes attribute information associated with the first object.

Optionally, the processor 980 is further configured to obtain a hiding presentation instruction through the object attribute interface, where the hiding presentation instruction carries the object identifier of the first object. The processor 980 is also configured to hide the first object and the first operable interface corresponding to the first object in the visual layout region according to the hiding presentation instruction.

Optionally, the processor 980 is further configured to obtain a function presentation instruction through the first operable interface, display a function interface corresponding to the first object in the visual layout region according to the function presentation instruction, and obtain a function selection instruction through the function interface. The function selection instruction carries an operation identifier. The processor 980 is further configured to perform a target operation corresponding to the operation identifier on the first object according to the function selection instruction.

In an exemplary embodiment of this disclosure, the processor 980 included in the terminal device is further configured to obtain an object switching instruction through an object management region of a target interface, were the object switching instruction carries an object identifier of a target object. The processor 980 is also configured to present, according to the object switching instruction, an operable interface corresponding to the target object in a visual layout region of the target interface, and present a programmable interface corresponding to the target object in a visual programming region of the target interface.

Optionally, the processor 980 is further configured to obtain a function presentation instruction through the operable interface in the visual layout region, and display a function interface of the target object in the visual layout region according to the function presentation instruction.

Optionally, the processor 980 is further configured display N to-be-programmed objects through the object management region, where N is an integer greater than or equal to 1. The processor 980 is further configured to obtain a region sliding instruction through the object management region, and display M to-be-programmed objects in the object management region according to the region sliding instruction. The M to-be-programmed objects and the N to-be-programmed objects have K identical to-be-programmed objects. M is an integer greater than or equal to 1, and K is an integer greater than or equal to 0 and less than N.

In an exemplary embodiment of this application, the processor 980 included in the terminal device is further configured to present an object management region on a target interface, where the object management region includes icon information and text information of a to-be-programmed object. The processor 980 is also configured to obtain an object attribute presentation instruction through the object management region, where the object attribute presentation instruction carrying an object identifier of a target object, and to present an object attribute interface of the target object in the target interface according to the object attribute presentation instruction. The object attribute interface includes attribute information associated with the target object.

In an exemplary embodiment of this application, the processor 980 included in the terminal device is further configured to present an object management region on a target interface, where the object management region includes icon information of a to-be-programmed object. The processor 980 is also configured to obtain an object attribute presentation instruction through a region outside the object management region, where the object attribute presentation instruction carrying an object identifier of a target object, and to present an object attribute interface of the target object in the target interface according to the object attribute presentation instruction. The object attribute interface includes attribute information associated with the target object.

A person skilled in the art will appreciate that for convenience and conciseness of description, for specific working processes of the foregoing systems, devices and units, reference may be made to the corresponding processes in the foregoing exemplary method embodiments, and details are not described herein again.

In the several exemplary embodiments provided in this disclosure, it is to be understood that the disclosed system, apparatus, and method may be implemented in other manners. For example, the described apparatus embodiment is merely an example. For example, the unit division is merely a logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate components may or may not be physically separated, and the components displayed as units may or may not be physical units, and may be located in one place or may be distributed over a plurality of network units. Some or all of the units may be selected according to actual needs to achieve the objectives of the solutions of the embodiments.

In addition, functional units in the embodiments of this application may be integrated into one processing unit, or each of the units may be physically separated, or two or more units may be integrated into one unit. The integrated unit may be implemented in the form of hardware, or may be implemented in a form of a software functional unit.

When the integrated unit is implemented in the form of a software functional unit and sold or used as an independent product, the integrated unit may be stored in a non-transitory computer-readable storage medium. Based on such an understanding, the technical solutions of this application essentially, or the part contributing to the related technology, or all or some of the technical solutions may be implemented in the form of a software product. The computer software product is stored in a storage medium and includes several instructions for instructing a computer device (which may be a personal computer, a server, a network device, or the like) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

In an exemplary embodiment of this disclosure, a non-transitory computer-readable storage medium is provided, including instructions, the instructions, when run on a computer, causing the computer to perform the following operations. In a first operation, an object switching instruction is obtained through an object management region of a target interface, where the object switching instruction carries an object identifier of a first object. In a second operation, according to the object switching instruction, a second operable interface corresponding to a second object is switched to a first operable interface corresponding to the first object in a visual layout region of the target interface, and a programmable interface corresponding to the second object is switched to a programmable interface corresponding to the first object in a visual programming region of the target interface. The first object and the second object are included in the object management region, and the first object and the second object have different object identifiers.

Optionally, the instructions, when run on a computer, cause the computer to obtain a region hiding instruction, and hide the object management region on the target interface according to the region hiding instruction.

Optionally, the instructions, when run on a computer, cause the computer obtain a region display instruction, and present, according to the region display instruction, the object management region on the target interface in a form of a sub-interface that is displayed independent of the target interface, or present the object management region in a preset region of the target interface in an embedded form according to the region display instruction.

Optionally, the instructions, when run on a computer, cause the computer to display N to-be-programmed objects through the object management region, where N is an integer greater than or equal to 1. The computer also obtains a region sliding instruction through the object management region, and displays M to-be-programmed objects in the object management region according to the region sliding instruction. The M to-be-programmed objects and the N to-be-programmed objects have K identical to-be-programmed objects, M is an integer greater than or equal to 1, and K is an integer greater than or equal to and less than N.

Optionally, the instructions, when run on a computer, cause the computer to present an object management region corresponding to a first mode on the target interface in a case that a first mode switching instruction is obtained, and present an object management region corresponding to a second mode on the target interface in a case that a second mode switching instruction is obtained. The first mode and the second mode are two different interface presentation modes.

Optionally, the instructions, when run on a computer, cause the computer to present a first object management region on the target interface, where the first object management region includes icon information and text information of a to-be-programmed object.

Optionally, the instructions, when run on a computer, cause the computer to present a second object management region on the target interface, where the second object management region includes icon information of a to-be-programmed object.

Optionally, the instructions, when run on a computer, cause the computer to obtain an object attribute presentation instruction, where the object attribute presentation instruction carries the object identifier of the first object. The computer also presents an object attribute interface of the first object in the target interface according to the object attribute presentation instruction, where the object attribute interface includes attribute information associated with the first object.

Optionally, the instructions, when run on a computer, cause the computer to obtain a hiding presentation instruction through the object attribute interface, where the hiding presentation instruction carries the object identifier of the first object. The computer also hides the first object and the first operable interface corresponding to the first object in the visual layout region according to the hiding presentation instruction.

Optionally, the instructions, when run on a computer, cause the computer to obtain a function presentation instruction through the first operable interface, and display a function interface corresponding to the first object in the visual layout region according to the function presentation instruction. The computer also obtains a function selection instruction through the function interface, where the function selection instruction carrying an operation identifier, and performs a target operation corresponding to the operation identifier on the first object according to the function selection instruction.

In an exemplary embodiment of this disclosure, a non-transitory computer-readable storage medium is provided, including instructions that, when run on a computer, cause the computer to obtain an object switching instruction through an object management region of a target interface, where the object switching instruction carries an object identifier of a target object. The computer also presents, according to the object switching instruction, an operable interface corresponding to the target object in a visual layout region of the target interface, and presents a programmable interface corresponding to the target object in a visual programming region of the target interface.

Optionally, the instructions, when run on a computer, cause the computer to obtain a function presentation instruction through the operable interface in the visual layout region, and display a function interface of the target object in the visual layout region according to the function presentation instruction.

Optionally, the instructions, when run on a computer, cause the computer to display N to-be-programmed objects through the object management region, where N is an integer greater than or equal to 1. The computer also obtains a region sliding instruction through the object management region, and displays M to-be-programmed objects in the object management region according to the region sliding instruction. The M to-be-programmed objects and the N to-be-programmed objects have K identical to-be-programmed objects, M is an integer greater than or equal to 1, and K is an integer greater than or equal to 0 and less than N.

In an exemplary embodiment of this application, a non-transitory computer-readable storage medium is provided, including instructions that, when run on a computer, cause the computer to present an object management region on a target interface, where the object management region includes icon information and text information of a to-be-programmed object. The computer also obtains an object attribute presentation instruction through the object management region, where the object attribute presentation instruction carrying an object identifier of a target object, and presents an object attribute interface of the target object in the target interface according to the object attribute presentation instruction. The object attribute interface includes attribute information associated with the target object.

In an exemplary embodiment of this disclosure, a non-transitory computer-readable storage medium is provided, including instructions that, when run on a computer, cause the computer to present an object management region on a target interface, where the object management region includes icon information of a to-be-programmed object. The computer also obtains an object attribute presentation instruction through a region outside the object management region. The object attribute presentation instruction carries an object identifier of a target object. The computer also presents an object attribute interface of the target object in the target interface according to the object attribute presentation instruction, where the object attribute interface includes attribute information associated with the target object.

The foregoing embodiments are merely intended for describing the technical solutions of this application, but not for limiting this application. Although this application is described in detail with reference to the foregoing embodiments, a person of ordinary skill in the art will recognize that they may still make modifications to the technical solutions described in the foregoing embodiments or make equivalent replacements to some technical features thereof, without departing from the spirit and scope of the technical solutions of the exemplary embodiments of this disclosure.

What is claimed is:

1. An object switching method based on visual programming, applicable to a terminal device, the method comprising:
obtaining, with circuitry of the terminal device, an object switching instruction through an object management region of a target interface, the object switching instruction carrying an object identifier of a first object;
switching, with the circuitry of the terminal device and according to the object switching instruction, a second operable interface corresponding to a second object to a first operable interface corresponding to the first object in a visual layout region of the target interface; and
in response to switching from the second operable interface to the first operable interface, switching, with the circuitry of the terminal device and according to the object switching instruction, a programmable interface corresponding to the second object to a programmable interface corresponding to the first object in a visual programming region of the target interface, the first object and the second object being comprised in the object management region, and the first object and the second object having different object identifiers.

2. The method according to claim 1, further comprising:
obtaining a region hiding instruction; and
hiding the object management region on the target interface according to the region hiding instruction.

3. The method according to claim 1, wherein before the obtaining of the object switching instruction, the method further comprises:
obtaining a region display instruction; and
presenting, according to the region display instruction, the object management region on the target interface in a form of a sub-interface that is displayed independent of the target interface, or presenting the object management region in a preset region of the target interface in an embedded form according to the region display instruction.

4. The method according to claim 1, further comprising:
displaying N to-be-programmed objects through the object management region, N being an integer greater than or equal to 1;
obtaining a region sliding instruction through the object management region; and
displaying M to-be-programmed objects in the object management region according to the region sliding instruction, the M to-be-programmed objects and the N to-be-programmed objects having K identical to-be-programmed objects, M being an integer greater than or equal to 1, and K being an integer greater than or equal to 0 and less than N.

5. The method according to claim 1, further comprising:
presenting an object management region corresponding to a first mode on the target interface in a case that a first mode switching instruction is obtained; and
presenting an object management region corresponding to a second mode on the target interface in a case that a second mode switching instruction is obtained, the first mode and the second mode being two different interface presentation modes.

6. The method according to claim 5, wherein the presenting of the object management region corresponding to the first mode on the target interface comprises:
presenting a first object management region on the target interface, the first object management region comprising icon information and text information of a to-be-programmed object.

7. The method according to claim 5, wherein the presenting of the object management region corresponding to the second mode on the target interface comprises:
presenting a second object management region on the target interface, the second object management region comprising icon information of a to-be-programmed object.

8. The method according to claim 5, further comprising:
obtaining an object attribute presentation instruction, the object attribute presentation instruction carrying the object identifier of the first object; and
presenting an object attribute interface of the first object in the target interface according to the object attribute presentation instruction, the object attribute interface comprising attribute information associated with the first object.

9. The method according to claim 8, wherein after the presenting of the object attribute interface of the first object in the target interface, the method further comprises:

obtaining a hiding presentation instruction through the object attribute interface, the hiding presentation instruction carrying the object identifier of the first object; and hiding the first object and the first operable interface corresponding to the first object in the visual layout region according to the hiding presentation instruction.

10. The method according to claim 1, further comprising:

obtaining a function presentation instruction through the first operable interface;

displaying a function interface corresponding to the first object in the visual layout region according to the function presentation instruction;

obtaining a function selection instruction through the function interface, the function selection instruction carrying an operation identifier; and performing a target operation corresponding to the operation identifier on the first object according to the function selection instruction.

11. An object switching apparatus based on visual programming, comprising:

processing circuitry coupled to memory and configured to obtain an object switching instruction through an object management region of a target interface, the object switching instruction carrying an object identifier of a first object;

switch, according to the object switching instruction obtained, a second operable interface corresponding to a second object to a first operable interface corresponding to the first object in a visual layout region of the target interface; and in response to switch from the second operable interface to the first operable interface, switch, according to the object switching instruction, a programmable interface corresponding to the second object to a programmable interface corresponding to the first object in a visual programming region of the target interface, the first object and the second object being comprised in the object management region, and the first object and the second object having different object identifiers.

12. A terminal device, comprising:

processing circuitry coupled to a memory and configured to obtain an object switching instruction through an object management region of a target interface, the object switching instruction carrying an object identifier of a first object;

switch, according to the object switching instruction, a second operable interface corresponding to a second object to a first operable interface corresponding to the first object in a visual layout region of the target interface; and in response to switch from the second operable interface to the first operable interface, switch, according to the object switching instruction, a programmable interface corresponding to the second object to a programmable interface corresponding to the first object in a visual programming region of the target interface, the first object and the second object being comprised in the object management region, and the first object and the second object having different object identifiers.

13. The terminal device according to claim 12, wherein the processing circuitry is further configured to:

obtain a region hiding instruction; and hide the object management region on the target interface according to the region hiding instruction.

14. The terminal device according to claim 12, wherein the processing circuitry is further configured to:

obtain a region display instruction; and present, according to the region display instruction, the object management region on the target interface in a form of a sub-interface that is displayed independent of the target interface, or present the object management region in a preset region of the target interface in an embedded form according to the region display instruction.

15. The terminal device according to claim 12, wherein the processing circuitry is further configured to:

display N to-be-programmed objects through the object management region, N being an integer greater than or equal to 1;

obtain a region sliding instruction through the object management region; and display M to-be-programmed objects in the object management region according to the region sliding instruction, the M to-be-programmed objects and the N to-be-programmed objects having K identical to-be-programmed objects, M being an integer greater than or equal to 1, and K being an integer greater than or equal to 0 and less than N.

16. The terminal device according to claim 12, wherein the processing circuitry is further configured to:

present an object management region corresponding to a first mode on the target interface in a case that a first mode switching instruction is obtained; and present an object management region corresponding to a second mode on the target interface in a case that a second mode switching instruction is obtained, the first mode and the second mode being two different interface presentation modes.

17. The terminal device according to claim 16, wherein the processing circuitry is further configured to:

present a first object management region on the target interface, the first object management region comprising icon information and text information of a to-be-programmed object.

18. The terminal device according to claim 16, wherein the processing circuitry is further configured to:

present a second object management region on the target interface, the second object management region comprising icon information of a to-be-programmed object.

19. The terminal device according to claim 16, wherein the processing circuitry is further configured to:

obtain an object attribute presentation instruction, the object attribute presentation instruction carrying the object identifier of the first object; and present an object attribute interface of the first object in the target interface according to the object attribute presentation instruction, the object attribute interface comprising attribute information associated with the first object.

20. A non-transitory computer-readable storage medium, comprising instructions that, when executed by a computer, cause the computer to perform the method according to claim 1.

* * * * *